(12) United States Patent
Hashimoto

(10) Patent No.: US 7,428,594 B2
(45) Date of Patent: Sep. 23, 2008

(54) FILE SERVER SYSTEM

(75) Inventor: Akiyoshi Hashimoto, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 862 days.

(21) Appl. No.: 10/655,692

(22) Filed: Sep. 5, 2003

(65) Prior Publication Data

US 2005/0022024 A1    Jan. 27, 2005

(30) Foreign Application Priority Data

Jun. 2, 2003    (JP) .............................. 2003-156127

(51) Int. Cl.
G06F 15/16    (2006.01)
(52) U.S. Cl. .................... 709/229; 709/217; 709/218; 709/219; 709/225
(58) Field of Classification Search ......... 709/217–219, 709/225, 229
See application file for complete search history.

(56) References Cited

U.S. PATENT DOCUMENTS

| | | | | |
|---|---|---|---|---|
| 5,423,046 A * | 6/1995 | Nunnelley et al. | ........... | 713/330 |
| 5,548,724 A | 8/1996 | Akizawa et al. | | |
| 5,687,347 A | 11/1997 | Omura et al. | | |
| 5,931,918 A | 8/1999 | Row et al. | | |
| 5,931,947 A * | 8/1999 | Burns et al. | ..................... | 726/4 |
| 5,983,261 A * | 11/1999 | Riddle | ......................... | 709/204 |
| 5,987,621 A | 11/1999 | Duso et al. | | |
| 6,067,618 A * | 5/2000 | Weber | ............................ | 713/1 |
| 6,122,631 A | 9/2000 | Berbec et al. | | |
| 6,324,581 B1 * | 11/2001 | Xu et al. | ...................... | 709/229 |
| 6,343,324 B1 * | 1/2002 | Hubis et al. | .................. | 709/229 |
| 6,606,695 B2 * | 8/2003 | Kamano et al. | ............. | 711/163 |
| 6,714,968 B1 * | 3/2004 | Prust | .......................... | 709/219 |
| 6,735,672 B2 * | 5/2004 | Nishikawa et al. | ........... | 711/114 |
| 6,742,094 B2 * | 5/2004 | Igari | ........................... | 711/163 |
| 6,834,299 B1 * | 12/2004 | Hamilton et al. | ............. | 709/220 |
| 6,842,841 B1 * | 1/2005 | Kuik et al. | .................... | 711/203 |
| 6,971,016 B1 * | 11/2005 | Barnett | ....................... | 713/182 |
| 7,051,103 B1 * | 5/2006 | Giroir et al. | ................. | 709/227 |
| 7,062,648 B2 * | 6/2006 | Moulton et al. | ............. | 713/153 |
| 7,143,288 B2 * | 11/2006 | Pham et al. | ................. | 713/165 |
| 7,155,527 B2 * | 12/2006 | Kanai | .......................... | 709/229 |
| 7,155,616 B1 * | 12/2006 | Hamlin | ........................ | 713/193 |
| 2001/0047482 A1 * | 11/2001 | Harris et al. | ................. | 713/200 |
| 2002/0040404 A1 * | 4/2002 | Lahr | ........................... | 709/231 |
| 2002/0087694 A1 * | 7/2002 | Daoud et al. | ................. | 709/226 |

(Continued)

OTHER PUBLICATIONS

Bakke et al. "iSCSI Naming and Discovery," available on-line at http://www.ietf.org/internet-drafts/draft-ietf-ips-iscsi-name-disc-09.txt, Internet Draft of IPS Working Group, the Internet Society (2002).

(Continued)

Primary Examiner—Jeffrey Pwu
Assistant Examiner—Brian P Whipple
(74) Attorney, Agent, or Firm—Townsend and Townsend and Crew LLP

(57) ABSTRACT

A file server is formed by hard disk drives directly connected to a LAN. When a hard disk drive is started, a file controller sets up a configuration that prevents other network devices from accessing the hard disk drive. This configuration makes the file controller the only network device that can access the hard disk drive, thus ensuring data security.

8 Claims, 20 Drawing Sheets

U.S. PATENT DOCUMENTS

| | | | |
|---|---|---|---|
| 2002/0091805 A1* | 7/2002 | Phillips et al. | 709/220 |
| 2002/0095602 A1* | 7/2002 | Pherson et al. | 713/201 |
| 2002/0103904 A1 | 8/2002 | Hay | |
| 2002/0114341 A1* | 8/2002 | Sutherland et al. | 370/428 |
| 2002/0161850 A1 | 10/2002 | Ulrich et al. | |
| 2002/0188748 A1* | 12/2002 | Blackwell et al. | 709/232 |
| 2003/0023665 A1 | 1/2003 | Matsunami et al. | |
| 2003/0023784 A1 | 1/2003 | Matsunami et al. | |
| 2003/0028614 A1* | 2/2003 | Jeon | 709/217 |
| 2003/0221124 A1* | 11/2003 | Curran et al. | 713/201 |
| 2004/0078599 A1* | 4/2004 | Nahum | 713/201 |
| 2004/0139167 A1 | 7/2004 | Edsall et al. | |

OTHER PUBLICATIONS

Gibson et al. "File Server Scaling with Network-Attached Secure Disks," Proceedings of the 1997 ACM Sigmetrics International Conferenceon Measurement and Modeling of Computer Systems, Seattle, WA (1997).

Vahalia Unix Internals: The New Frontiers, pp. 291-313, Prentice Hall (1995).

* cited by examiner

| NUMBER | MAC ADDRESS | IP ADDRESS | HDD IDENTIFIER | ALIAS NAME |
|---|---|---|---|---|
| 0 | 00-00-87-A1-F8-8D | 192.215.0.3 | eui.0000870023445f00 | Hitachi-OPEN-K-sn-20020001 |
| 1 | 00-00-87-A1-F8-8E | 192.215.0.4 | eui.0000870023445f01 | Hitachi-OPEN-K-sn-20020002 |
| 2 | 00-00-87-A1-F8-8F | 192.215.0.5 | eui.0000870023445f02 | Hitachi-OPEN-K-sn-20020003 |
| 3 | 00-00-87-A1-F8-90 | 192.215.0.6 | eui.0000870023445f03 | Hitachi-OPEN-K-sn-20020004 |
| ⋮ | ⋮ | ⋮ | ⋮ | ⋮ |

| MAC ADDRESS | IP ADDRESS | AUTHENTICATION CODE | OWNER FLAG |
|---|---|---|---|
| Everyone | Everyone | 00000000_00000000_00000000_00000000 | 0 |

| MAC ADDRESS | IP ADDRESS | AUTHENTICATION CODE | OWNER FLAG |
|---|---|---|---|
| 00-00-87-A1-F8-00 | 192.215.0.0 | 01234567_89ABCDEF_01234567_89ABCDEF | 1 |

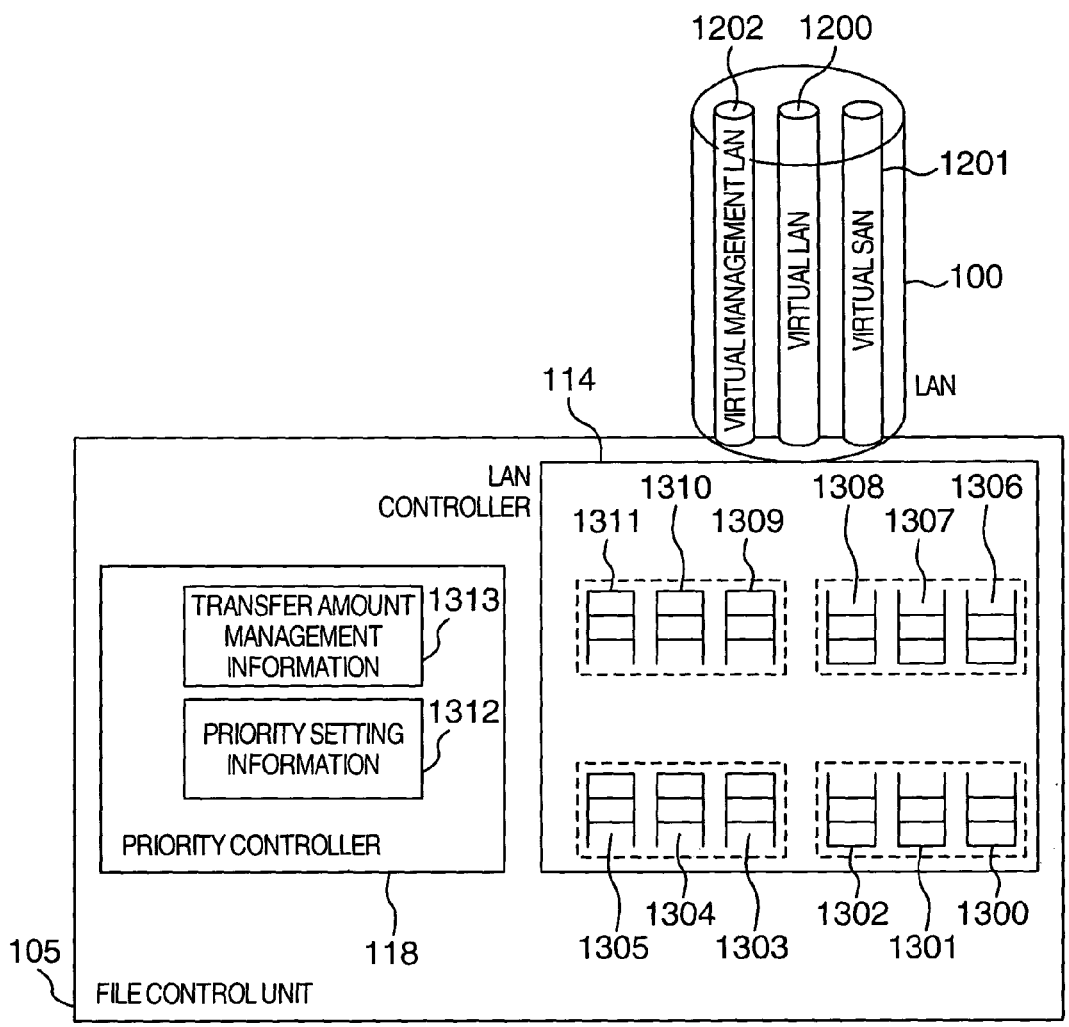

| VIRTUAL NETWORK TYPE | TRANSFER AMOUNT | BANDWIDTH | PRIORITY |
|---|---|---|---|
| VIRTUAL MANAGEMENT LAN | 51 | 10% | 3 |
| VIRTUAL LAN | 64123543 | 40% | 1 |
| VIRTUAL SAN | 556498333 | 50% | 2 |

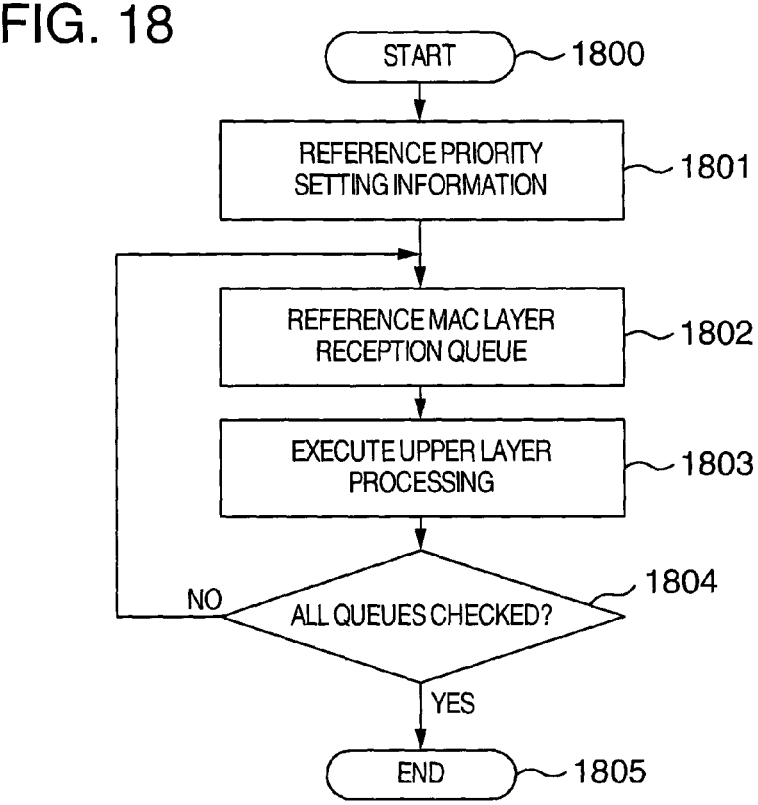
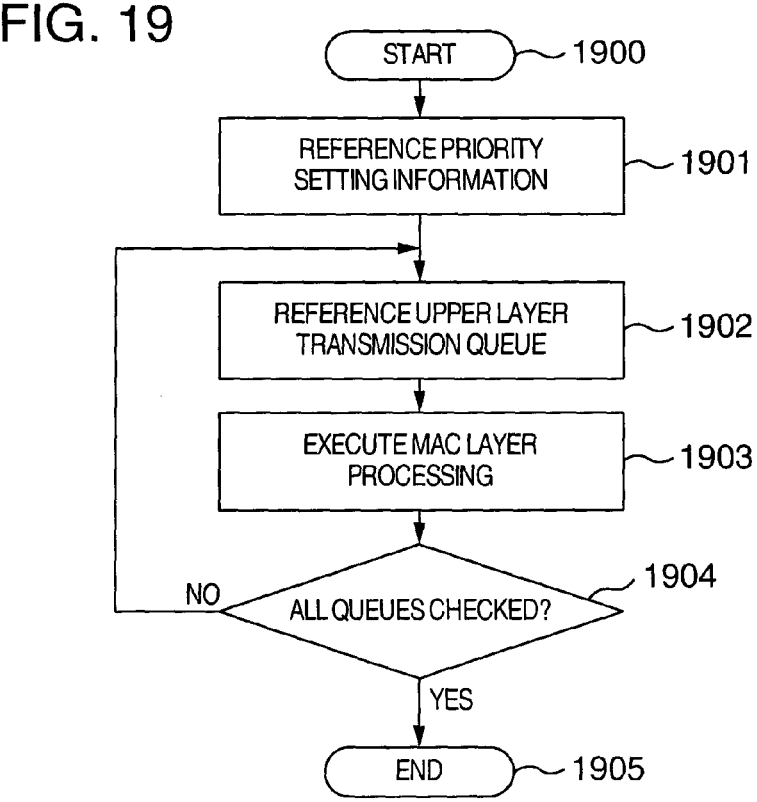

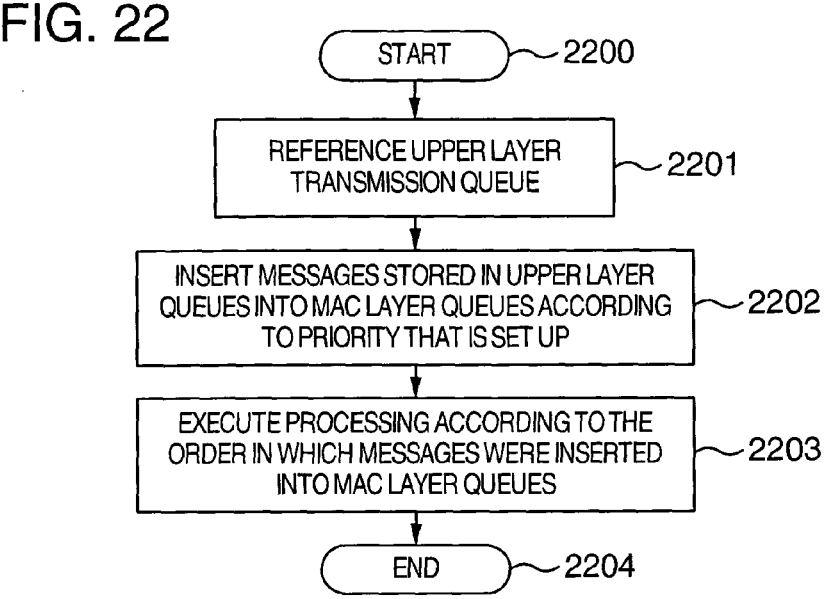
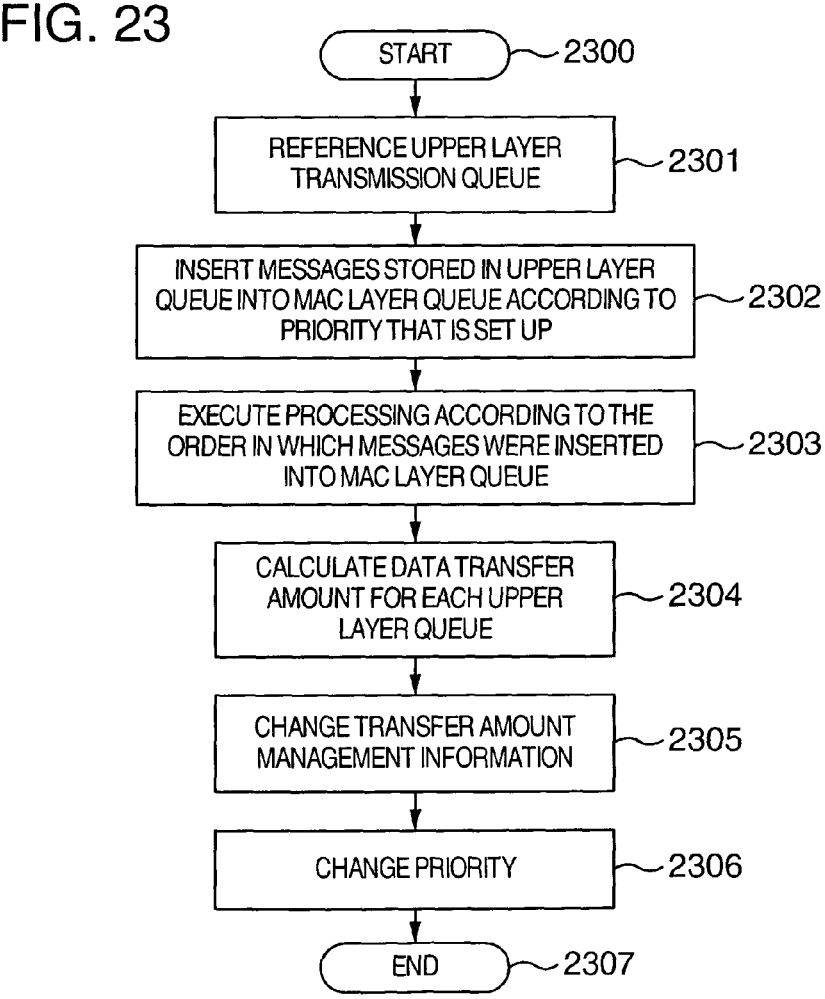

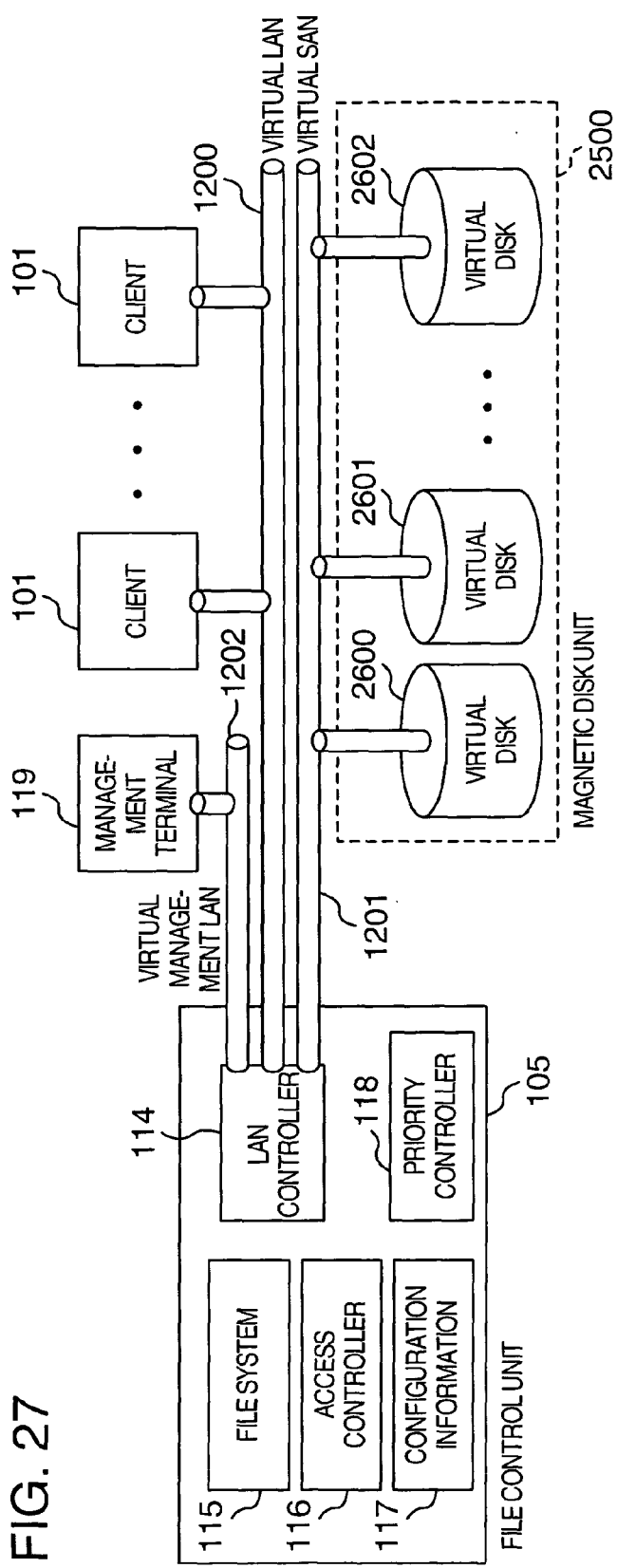

FILE SERVER SYSTEM

BACKGROUND OF THE INVENTION

The present invention relates to a computer system, and more particularly to a file server that provides a plurality of networked clients with file services.

Technologies for sharing data among a plurality of networked computers have been developed since the 1980s. One of the most popular data sharing technologies is Sun Microsystems's NFS (Network File System). NFS is described briefly in "UNIX Internals: The New Frontiers" (written by Uresh Vahalia, translated by Hideyuki Tokuda, Akira Nakamura, Yoshihito Tobe, and Yoshiyuki Tuda, published by Pearson Education, 2000). NFS is a technology for managing data on a file basis. A computer in which files are saved is called a file server, and a computer that uses the files saved in a file server via a network is called a client. NFS is a technology that allows the user to use files saved in the file server as if they were saved in the client's disk. In practice, NFS is defined as a network communication protocol between a file server and a client.

As network computing has rapidly become popular in recent years, technologies for a secondary storage unit directly connectable to an IP network such as a LAN have been proposed. They include NetSCSI, NASD (Network Attached Secure Disks), and an ISCSI standard defined by IETF (Internet Engineering Task Force). NetSCSI and NASD are described in detail in "File Server Scaling with Network-Attached Secure Disks" (written by Garth A. Gibson et. al, Research paper "THE 1997 ACM SIGMETRICS INTERNATIONAL CONFERENCE ON MEASUREMENT AND MODELING OF COMPUTER SYSTEMS, pp. 272-284). iSCSI is a standard that allows SCSI (Small Computer System Interface) protocol communication to be performed on a network. This is described in detail in "Internet Draft iSCSI" (written by Julian Satran, et. al, 2002).

FIG. 2 shows the configuration common to NetSCSI and NASD. In the system shown in FIG. 2, clients 101 that receive file services, hard disk drives 103 in which data is saved, and a file control unit 105 that manages and controls the hard disk drives 103 are connected to a LAN 100. The hard disk drive 103 comprises a magnetic disk medium 106 on which data is recorded and a disk control unit 107 that communicates with devices connected to the LAN 100 and records data on the magnetic disk medium 106 in response to an instruction from other devices. In addition to the usual data read/write control function, the disk control unit 107 has an authentication controller 108 that permits or inhibits communication with other devices connected to the LAN 100. The authentication controller 108 has authentication information 109 on the devices with which communication is permitted. The file control unit 105 comprises a LAN controller 114 that performs communication on the LAN, a file system 115 that provides the clients 101 with data on the hard disk drive 103 as a file, and an access controller 116 that controls the authority to access the hard disk drive 103. According to the description in "File Server Scaling with Network-Attached Secure Disks" (written by Garth A. Gibson et. al, Research paper "THE 1997 ACM SIGMETRICS INTERNATIONAL CONFERENCE ON MEASUREMENT AND MODELING OF COMPUTER SYSTEMS, pp. 272-284, the operation of the system in FIG. 2 is roughly as follows.

The client 101 sends a file access instruction to the file control unit 105. In response to the file access instruction, the file system 115 in the file control unit 105 analyzes the request from the client 101 and issues a data input/output instruction to the hard disk drive 103 to or from which data is written or read. In response to the input/output instruction, the hard disk drive 103 transfers data with the client 101 who issued the file access instruction. Upon completion of data transfer, the hard disk drive 103 informs the file control unit 105 that the data transfer has been completed. In response to the data transfer completion information, the file control unit 105 informs the client 101 that the file access instruction has been completed.

The hard disk drive 103 communicates also with the clients 101. Therefore, it has the authentication controller 108 for certificating clients. The file control unit 105 has the access controller 116 that determines the security policy of the hard disk drives 103.

"File Server Scaling with Network-Attached Secure Disks" (written by Garth A. Gibson et. al, Research paper "THE 1997 ACM SIGMETRICS INTERNATIONAL CONFERENCE ON MEASUREMENT AND MODELING OF COMPUTER SYSTEMS, pp. 272-284) also discloses a technology for encrypting communication between the file control unit 105 and the hard disk drive 103 and for generating virtual communication channels. This prevents the clients 101 from wiretap communication between the file control unit 105 and the hard disk drive 103.

In addition, the filer server unit has no display or keyboard; instead, the user usually operates the file server unit from a management terminal connected to the LAN 100.

SUMMARY OF THE INVENTION

A first problem to be solved by the present invention is to secure the safety of data saved on hard disk drives when clients and hard disk drives are connected to the same LAN. The conventional technology described in "File Server Scaling with Network-Attached Secure Disks" (written by Garth A. Gibson et. al, Research paper "THE 1997 ACM SIGMETRICS INTERNATIONAL CONFERENCE ON MEASUREMENT AND MODELING OF COMPUTER SYSTEMS, pp. 272-284) is characterized in that the client 101 and the hard disk drive 103 send and receive data to allow the client 101 to directly read data from the hard disk drive 103. Although this method secures the safety of data as long as the client 101 follows the procedure described above, the client 101 may also directly access data on the hard disk drive 103 without sending a file access request to the file control unit 105. Because communication between the hard disk drive 103 and the client 101 is permitted, the hard disk drive 103 cannot prevent an access request that does not receive permission from the file control unit 105 as described above.

A second problem to be solved by the present invention is the amount of processing required for encrypting communication between the file control unit 105 and the hard disk drive 103. In the above referenced document described by Garth A. Gibson et al., the communication between the file control unit 105 and the hard disk drive 103 is performed through encrypted communication. The communication is encrypted to prevent the client 101 from obtaining communication data transferred between the file control unit 105 and the hard disk drive 103. Normally, the encryption and decryption of data that is sent and received requires a large amount of computational capacity. Installing the encryption/decryption function that implements practical communication speeds on each hard disk drive increases the cost.

A third problem to be solved by the present invention is that, because multiple different types of traffic flow on the LAN 100, each traffic type cannot be processed appropriately. That is, the amount of data input/output traffic to or from the hard disk drive 103 is large. By contrast, the data size of communication traffic between the client 101 and the file control unit 105 or between the management terminal and the file control unit 105 is relatively small. If a large amount of data is being transferred when a maintenance engineer tries to operate the file control unit 105 from the management terminal, an operation delay occurs. This delay, if large, would put the file control unit 105 in an inoperable condition.

To solve the first problem, the file control unit is allowed to establish a setting, for example, when a hard disk drive is turned on for the first time, in such a way that the hard disk drive cannot communicate with devices other than the file control unit. This solution prevents the clients or the management terminal from reading data from, or writing data to, the hard disk drive without obtaining permission from the file control unit, thus ensuring data safety. As a result, data is transferred always via the file control unit.

To solve the second problem, a VLAN (Virtual LAN is introduced. A VLAN, which is a method of building a virtual network on a physical network to provide an easy-to-configure network system, is implemented by switches or routers that form a LAN. The VLAN technology is described in detail in Japanese "VPN/VLAN Class Book" (supervised by Haruki Koretomo, Multimedia communication Study Group, ASCII Corporation, 1999). This VLAN can be applied to a file server to solve the second problem. That is, the file control unit and the clients are made to belong to the same VLAN. The file control unit and the hard disk drives are made to belong to a second VLAN. Finally, the file control unit and the management terminal are made to belong to a third VLAN. Because communication cannot be performed among different VLANs, this configuration inhibits the clients and the management terminal from directly accessing hard disk drives. Because this configuration is built using the switches and routers included in the network, the file control unit and the hard disk drives need not have the encrypted communication function and therefore the cost may be reduced.

To solve the third problem, the file control unit is allowed to set the priority of LAN communication with each sender/receiver. That is, by assigning the highest priority to the communication with the management terminal, the management terminal can always operate the file control unit. This priority control is effective from another aspect. It is known that the services are sometimes suspended because an excessive network load is placed on a server in general. Even when the file control unit is attacked in this way, the priority control according to the present invention allows the manager to perform operation via the management terminal to prevent file services from being suspended.

BRIEF DESCRIPTION OF THE DRAWINGS

FIG. 3 is a diagram showing the contents of configuration information 117.

FIG. 4 is a diagram showing the initial status of authentication information 109.

FIG. 5 is a diagram showing the status of the authentication information 109 that has been initialized.

FIG. 13 is a diagram showing the internal status of the file control unit 105 according to the present invention when communication is made via virtual networks.

FIG. 14 is a diagram showing priority setting information 1312.

FIG. 18 is a flowchart showing the reception processing of the file control unit 105 when priority setting is performed.

FIG. 19 is a flowchart showing the transmission processing of the file control unit 105 when priority setting is performed.

FIG. 22 is a flowchart showing the transmission processing of the file control unit 105 when priority setting is performed.

FIG. 23 is a flowchart showing the reception processing of the file control unit 105 when bandwidth control is performed.

FIG. 27 is a diagram showing the concept when virtual networks according to the present invention are applied to the system in FIG. 25.

FIG. 28 is a diagram showing the contents of authentication information 2510.

DETAILED DESCRIPTION OF THE EMBODIMENTS

Figure 1:
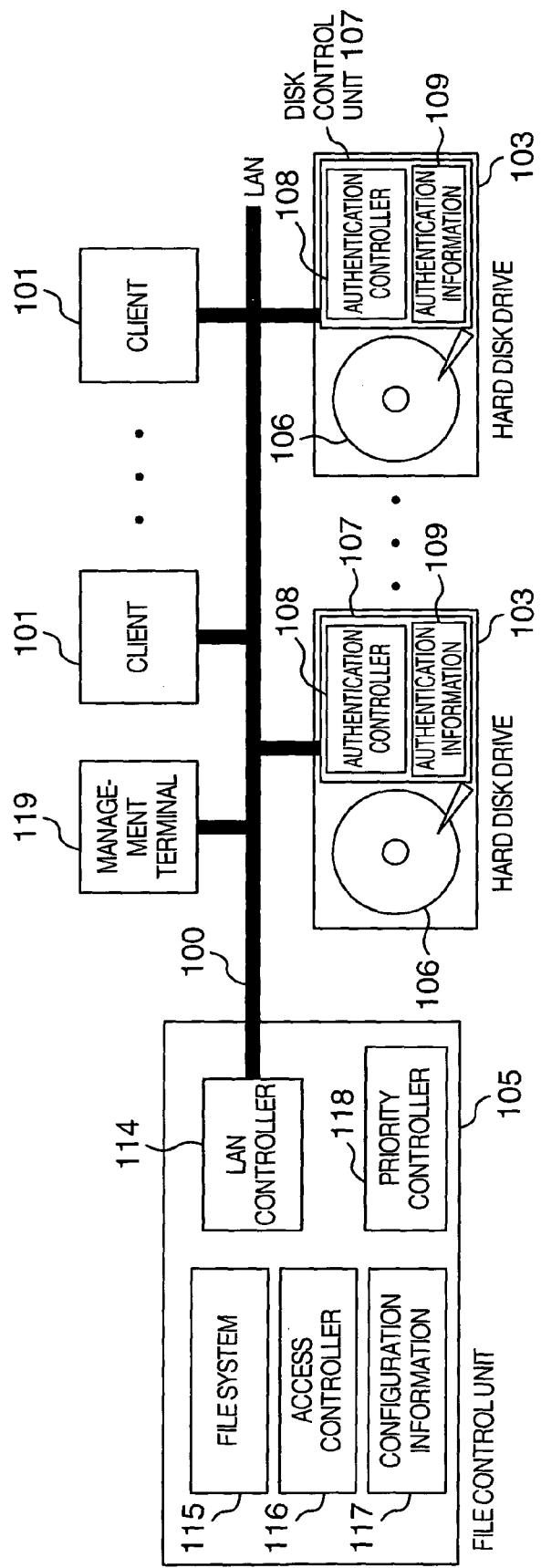
FIG. 1 is a diagram showing the configuration of a file server according to the present invention.

Some embodiments of the present invention will be described with reference to the drawings. FIG. 1 is a diagram showing the configuration of a file server according to the present invention. Clients 101 that receive file services, hard disk drives 103 in which data is saved, and a file control unit 105 that manages the data input/output of hard disk drives 103 and that provides the clients 101 with file services are connected to a LAN 100. Although the LAN 100 is assumed to be a LAN defined by the IEEE802.3 standard (usually called Ethernet (registered trademark)) in this embodiment, the present invention does not, of course, depend on the type of the LAN 100. For communication on the LAN 100, the TCT/IP protocol is assumed. Neither does the present invention depend on the TCP/IP protocol.

The hard disk drive 103 comprises a magnetic disk medium 106 and a magnetic disk control unit 107. In addition to the execution of the input/output operation for the magnetic disk medium 106, the magnetic disk control unit 107 has an authenticate 108 and authentication information 109 that determine the permission/inhibition of communication via the LAN 100. The authentication information 109 includes information on the network devices that are permitted to execute communication with the hard disk drive 103 via the LAN 100. When a network device connected to the LAN 100 sends a communication permission request to the hard disk drive 103, the authentication controller 108 references the authentication information 109 to determine the permission/inhibition of communication. That is, when a communication permission request is received from a network device not registered with the authentication information 109, the authentication controller 108 replies to the network device that communication is not permitted. The authentication controller 108 also changes the authentication information 109 in response to an instruction from a user or a manager.

The file control unit 105 comprises a LAN controller 114, a file system 115, an access controller 116, configuration information 117, and a priority controller 118. The file system 115 has a function to manage the storage area of the hard disk drives 103 to provide the client 101 with a storage area as a virtual file. The LAN controller 114 has a function used by the file control unit 105 to perform communication using the LAN 100. The configuration information 117 is the device configuration information such as the type of hard disk drive 103 and the number of hard disk drives 103. The access controller 116 operates access control properties of the hard disk drives 103. The priority controller 118 specifies the priority of communication on the LAN 100, performed by the file control unit 105, to allow it to perform communication according to the priority. In this embodiment, the file control unit 105 that executes data input/output for the hard disk drives 103 uses iSCSI as the protocol standard. That is, in the description below, it is assumed that the file control unit 105 and the hard disk drives 103 have the iSCSI interface. The present invention does not, of course, depend on iSCSI.

Next, the configuration information 117 will be described with reference to FIG. 3. The configuration information 117 is information on the hard disk drives 103, such as ID information, used by the file control unit 105 to save data. A number column 300 contains a number internally assigned by the file control unit 105 to a hard disk drive 103. A MAC address column 301 indicates the MAC address of a hard disk drive 103. The MAC address, defined by the IEEE802.3 standard, is a number unique to a network device. The MAC address is assigned to a network device during manufacturing. The hard disk drive 103, which can connect directly to the LAN 100, has a MAC address. The file control unit 105 obtains the MAC address of a hard disk drive 103 and stores it in the MAC address column 301 of the configuration information 117. An IP address column 302 contains the IP address of a hard disk drive 103. An IP address is assigned to a hard disk drive 103 in one of several ways: the user uses some tool to set an IP address, a hard disk drive 103 automatically sets an IP address using the DHCP (Dynamic Host Configuration Protocol), and so on. In this embodiment, it is assumed that the hard disk drive 103 has successfully obtained IP addresses in some way.

An HDD identifier column 303 contains an identifier unique to a hard disk drive 103. This identifier is different from a MAC address. That is, a MAC address cannot be used as an identifier when communication is made via a router and therefore a MAC address is not used as an identifier unique to a device connected to a network. The LAN standard requires an information sending network device to send information with a MAC address attached to the information. This allows a receiving network device to identify a sending device. However, this does not hold true when a sending network device and a receiving network device are connected to different networks. In this case, the information and the MAC address sent from a sending network device are received once by a router. The router then sends the information to the receiving side. At this time, the router changes the MAC address to the router's MAC address before sending the information. Therefore, when a sending network device and a receiving network device communicate via a router, the MAC address cannot be used as an identifier unique to the network device. To solve this problem, the iSCSI standard proposes the specifications for assigning a unique identifier to a network device that can perform communication via the iSCSI protocol. Among a plurality of identifiers described in the specifications, a 64-bit identifier, EUI, is used in the description of this embodiment. EUI is described in detail in "Internet Draft iSCSI" (written by Julian Satran, et. al, 2002). The magnetic disk identifier column 303 contains EUI in the hexadecimal format. An Alias name column 304 contains an alias name different from an EUI-format identifier of a hard disk drive 103. Although EUI identifies a network device, the user finds it difficult to identify what network device is represented by EUI. Therefore, an alias name easily understood by the user is stored in the Alias name column 304. The format of an alias name in FIG. 3 is "Hitachi-OPEN-K-sn-XXXXXXX". "Hitachi" is the vendor name, "OPEN-K" is the product type name, the number after "sn" indicates the manufacturer's serial number, and "XXXXXXX" is the serial number. An alias name in this format allows the user to identify the type of a network device. An alias name, which is not an identifier, need not be unique to a network device. An alias name used in this embodiment is only an example, and the present invention does not, of course, depends on the format of an alias name. A HDD identifier, one of hard disk drive 103 information pieces stored in the configuration information 117, is set by the manager in advance. The manager specifies the hard disk drives usable by the file control unit 105 in advance in this way to prevent other file control units from writing data on a hard disk drive in use and from destroying data written on that disk drive.

Next, FIGS. 4 and 5 show the authentication information 109 on the hard disk drive 103. FIG. 4 shows the initial status of the authentication information 109, and FIG. 5 shows the status in which information has been set by the file control unit 105. One row in FIGS. 4 and 5 represents information on a network device permitted communication with the hard disk drive 103. MAC address columns 400 and 500 are columns in which the MAC address of a network device permitted communication with the hard disk drive 103 is stored. IP address columns 401 and 501 are columns in which the IP address of a network device permitted communication with the hard disk drive 103 is stored. Authentication code columns 402 and 502 are columns in which an authentication code used to judge the permission/inhibition of communication is stored. Owner flags 403 and 503 are flags indicating which network device stored in the authentication information 109 is the owner of the hard disk drive 103. In this embodiment, when the owner flag 403 is "1", the network device is the owner of the hard disk drive 103. When the owner flag 403 is not "1", the network device is not the owner of the hard disk drive 103. The authentication information 109 can be changed only by the owner of the hard disk drive 103.

A network device sends an authentication code to a hard disk drive 103 to obtain communication permission before starting communication with the hard disk drive 103. The hard disk drive 103 compares the received authentication code with the stored authentication code; communication is permitted when they match but is inhibited when they mismatch. Although certification is made in this embodiment in the method described above, there are many certification methods. Of course, the present invention does not depend on the certification method. One of the features of the present invention is that the hard disk drive 103 allows the authentication information 109 to be changed via the LAN 100, and a MAC address column 404 contains "Every one". This indicates that all network devices are permitted communication with this hard disk drive 103. The character string "Every one" need not be used; any code implying that all network devices are permitted communication may be used. In this embodiment, the code "Every one" is used. Immediately after the hard disk drive 103 is initialized, all network devices are permitted communication. An IP address column 405 also contains "Every one" to indicate that all network devices are permitted communication. An authentication code column 406 contains "00000000_00000000_00000000_00000000". This means that no authentication code is set. FIG. 5 indicates the status in which the file control unit 105 has set information in the authentication information 109. In FIG. 5, values are set in a MAC address column 504, an IP address column 505, and an authentication code 506. The hard disk drive 103 communicates only with network devices described in the authentication information 109. By increasing the number of authentication information rows, communication with a plurality of network devices may be permitted.

Figure 6:
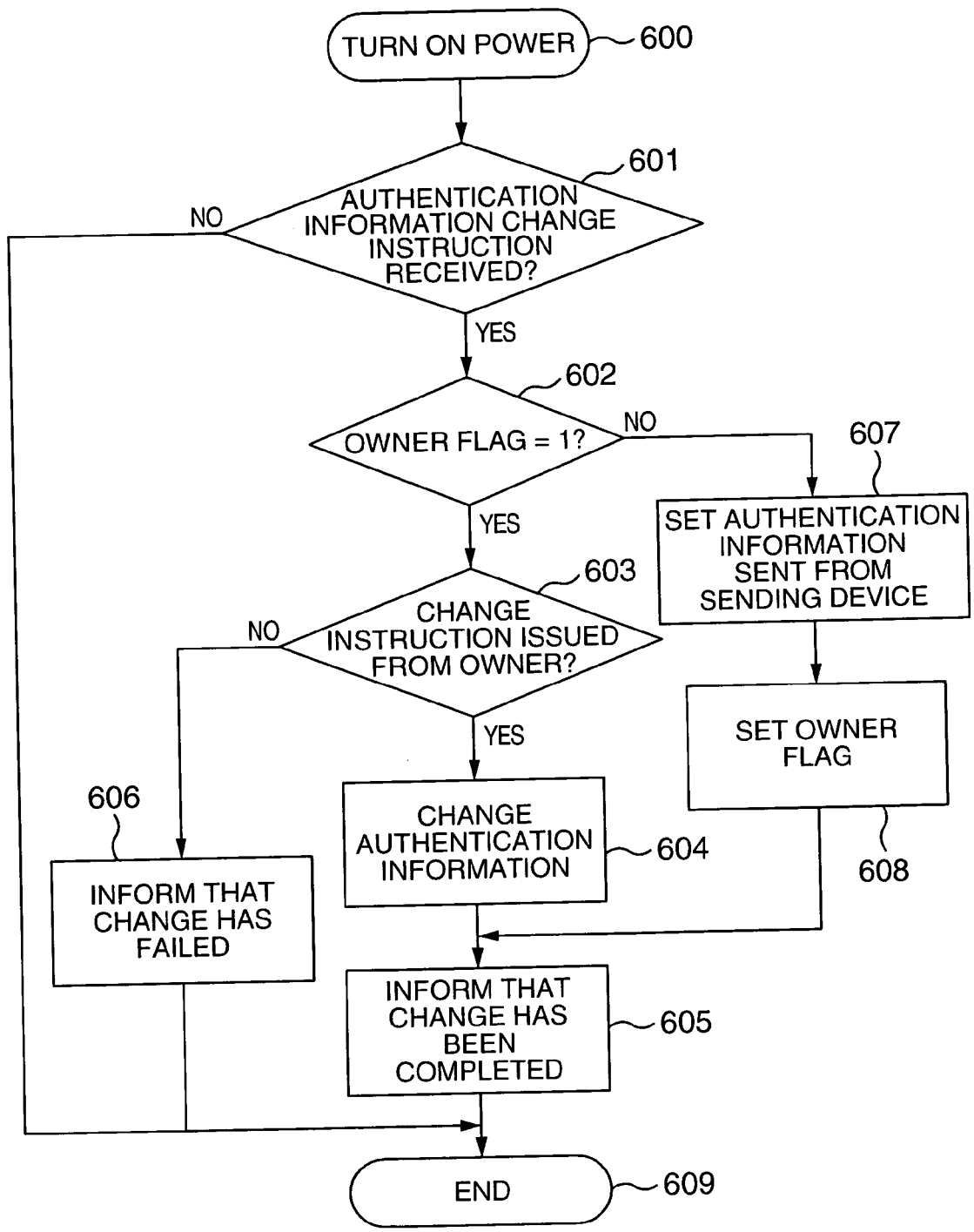
FIG. 6 is a flowchart showing the authentication information setting processing for a hard disk drive 103.

One of the features of the present invention is that the authentication information 109 may be changed from a network device connected to the LAN 100. Normally, this type of authentication information is set by a user or a manager via means other than the LAN 100 before the hard disk drive 103 is connected to the LAN 100. This is because such an authentication code is meaningless unless it is set via a safe path other than the LAN 100. On a device such as the hard disk drive 103, the authentication information 109 is stored usually in a non-volatile memory, such as an EEPROM or a flash memory, and the authentication information 109 is re-written by a special tool. Today, not a few file server systems have a large number of hard disk drives 103 installed. Is such a system, it is very tedious and unpractical to set authentication information on the hard disk drives, one at a time, with a special tool. Therefore, it is more practical for the file control unit 105 to set the authentication information 109 via the LAN 100. This is because the procedure described above is automated by the file control unit 105. However, if the authentication information 109 can be set via the LAN 100, a network device not permitted communication with the hard disk drive 103 can also change the authentication information 109 and therefore communicate with the hard disk drive 103. That is, the authentication information 109 does not function as authentication information. In view of this, this system permits only a network device whose owner flag 403 is "1" to change the authentication information. When the user turns on the hard disk drive 103 for the first time after installing it, the file control unit 105 sets its own authentication code and at the same time sets the owner flag 403 to "1". This process is shown in FIG. 6.

Step: 600 The hard disk drive 103 is turned on in this step.

Step: 601 A check is made in this step if the hard disk drive 103 has received an instruction (command) to change the authentication information 109 from the LAN 100. If the instruction is not received, the hard disk drive 103 waits for the instruction to be received or executes other processing.

Step: 602 When the hard disk drive 103 receives an instruction to change the authentication information 109, the authentication information 109 is checked if there is an entry whose owner flag column 403 is set to "1". If there is an entry whose owner flag column 403 is set to "1", control is passed to step 603. If there is no entry whose owner flag column 403 is set to "1", control is passed to step 607.

Step: 603 If there is an entry whose owner flag column 403 is set to "1", only the network device which is the owner can change or modify the authentication information 109. In step 603, a check is made if the network device that has issued the authentication information-change instruction is the owner. If the network device that has issued the authentication information-change instruction is the owner of the hard disk drive 103, control is passed to step 604; otherwise, control is passed to step 606.

Step: 604 Because it is confirmed that the owner of the hard disk drive 103 will change the authentication information 109, the authentication controller 108 of the hard disk drive 103 changes the authentication information 109 according to the instruction. The sender of the authentication information-change instruction sends the contents of the change with the instruction.

Step: 605 The hard disk drive 103 informs the network device, which issued the authentication information-change instruction, that the change has been completed.

Step: 606 If the authentication information-change instruction was received from a device other than the owner of the hard disk drive 103, the hard disk drive 103 informs the issuer of the authentication information-change instruction that the change has failed.

Step: 607 When no owner is set, any network device may change the authentication information 109. In this step, information on the network device that has sent this instruction is set.

Step: 608 The owner flag column 403 of the network device entry that is set in step 607 is set to "1". That is, the network device that issued the authentication information-change instruction to the hard disk drive 103 first becomes the owner of the hard disk drive 103.

Step: 609 End of processing

Figure 7:
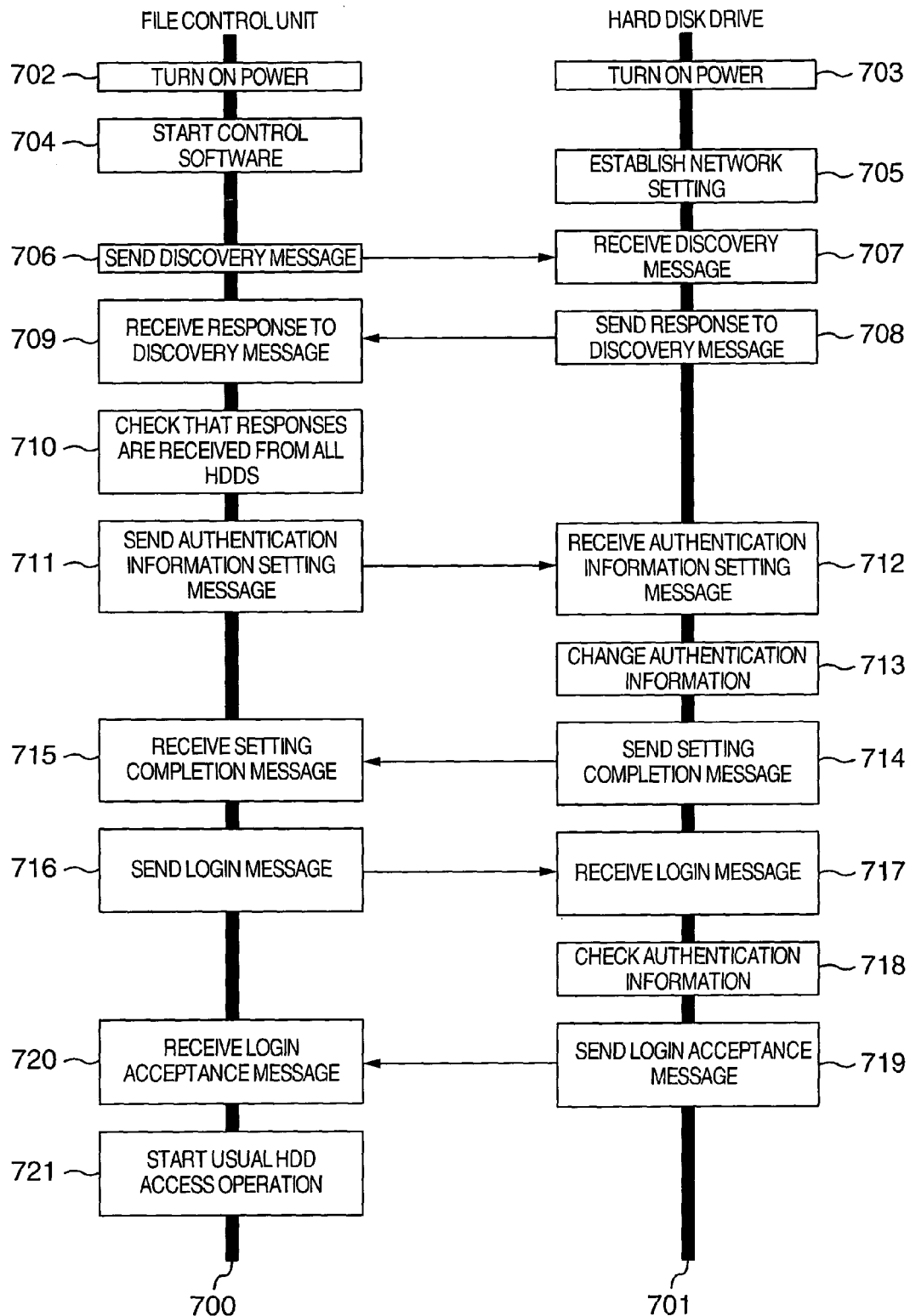
FIG. 7 is a ladder chart showing the initialization process of a file control unit 105 and the hard disk drive 103.

The initialization procedure of the file server in FIG. 1 will be described with reference to the ladder chart in FIG. 7. A time axis 700 indicates the time axis of the file control unit 105, and a time axis 701 indicates the time axis of the hard disk drive 103.

Step: 702 The file control unit 105 is turned on in this step.

Step: 703 The hard disk drive 103 is turned on in this step.

Step: 704 The file system 115 installed in the file control unit 105 to provide file services is started in this step.

Step: 705 The hard disk drive 103 is started in this step to establish the network setting. This step includes a step in which an IP address is obtained by a method such as the DHCP described above.

Step: 706 The file control unit 105 issues a discovery message (hard disk drive search message) to search for hard disk drives 103 connected to the LAN 100. The file control unit 105 issues the discovery message in the broadcast mode. This discovery procedure is described in detail in "ISCSI Naming and Discovery" (Mark Bakkek, et. al, 2003) (hereinafter called document 1).

Step: 707 The hard disk drive 103 receives the discovery message issued in step 706.

Step: 708 The hard disk drive 103 sends a response message to the discovery message back to the file control unit 105. The contents of the response message are the MAC address, IP address, HDD identifier, alias name, and so on described in FIG. 3.

Step: 709 The file control unit 105 receives the response message from the hard disk drive 103.

Step: 710 Because the response message includes the HDD identifier, the file control unit 105 compares it with the HDD identifiers stored in advance in the configuration information 117 in FIG. 3. It is supposed that the manager of the file server has stored the HDD identifiers in the configuration information. If the HDD identifier included in the response message matches one of the HDD identifiers stored in advance in the configuration information 117, the file control unit 105 stores the MAC address, IP address, and alias name in the configuration information 117. The file control unit 105 continues comparison for all response messages. The file control unit 105 confirms that response messages are received from all hard disk drives 103 stored in advance in configuration information 117. If at least one hard disk drive 103 stored in the configuration information 117 does not send a response message, the file control unit 105 displays an error on the management terminal and suspends initialization. If the file control unit 105 confirms that it has received response messages from all hard disk drives 103 stored in the configuration information 117, it continues the initialization procedure.

Step: 711 The file control unit 105 sends a message to the hard disk drive 103 to change the authentication information 109. Because any network device can communicate with the hard disk drive 103 in the initial status as described above, only the file control unit 105 is specified as a network device that is permitted communication. More specifically, the MAC address, IP address, and authentication code of the file control unit 105 are set in the authentication information 109 in FIG. 5, and the authentication information on other network devices is not set. The hard disk drive 103 changes the authentication information 109 according to the procedure shown in FIG. 6.

Step: 712 The hard disk drive 103 receives the authentication information setting message from the file control unit 105.

Step: 713 The hard disk drive 103 sets the information in the authentication information 109 according to the message received in step 712. Once this step is executed, the clients 101 and the management terminal cannot access the hard disk drive 103 in which the file control unit 105 is to save data and, therefore, data is secured. According to the procedure in FIG. 6, the owner flag 403 is also set to "1". If some other network device has already set its authentication information in the authentication information 109 of the hard disk drive 103, the file control unit 105 cannot set its authentication information 109.

Step: 714 When the authentication information 109 has been changed, the hard disk drive 103 informs the file control unit 105 that the setting of authentication information has been completed. If some other network device has already set its authentication information in the authentication information 109 of the hard disk drive 103, the hard disk drive 103 informs the file control unit 105 that the setting of the authentication information 109 has failed.

Step: 715 The file control unit 105 receives the information sent from the hard disk drive 103 in step 714. If the file control unit 105 cannot set its information in the authentication information 109, it displays the information on the management terminal to inform the manager of the condition.

Step: 716 The file control unit 105 issues a communication permission request to the hard disk drive 103 in this step. This procedure is called a login. An example is described in the above-referenced Julian Satran et al "Internet Draft iSCSI", 2002. In this step, the file control unit 105 sends an authentication code.

Step: 717 The hard disk drive 103 receives the authentication code sent from the file control unit 105 in step 716.

Step: 718 The hard disk drive 103 checks if the received authentication code is stored in the authentication information 109.

Step: 719 If the authentication code equals the code stored in the authentication information 109, the hard disk drive 103 sends a login acceptance message to the file control unit 105. If the authentication code is not stored in the authentication information 109, the hard disk drive 103 sends a login rejection message to the file control unit 105.

Step: 720 The file control unit 105 receives the login acceptance or rejection message sent from the hard disk drive 103.

Step: 721 When the hard disk drive 103 accepts the login, the file control unit 105 can directly access the hard disk drive 103.

Next, with reference to FIGS. 8, 9, and 10, the operation executed when the client 101 reads data from, and writes data to, a file saved on the hard disk drive 103 will be described.

Figure 8:
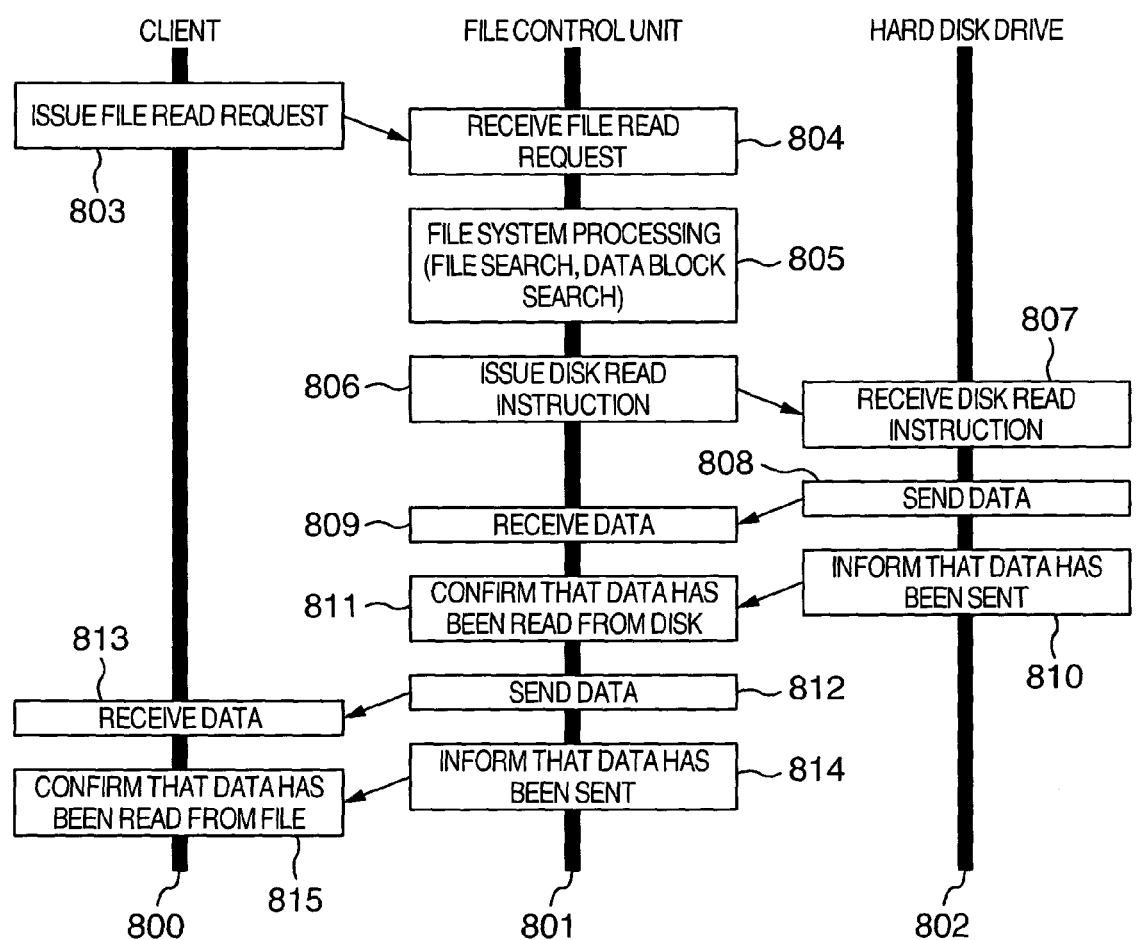
FIG. 8 is a ladder chart showing the operation executed when a client 101 sends a file read request to the file control unit 105 according to the present invention.

FIG. 8 is a ladder chart showing the operation executed when the client 101 reads a file. A time axis 800 indicates the processing flow of the client 101, a time axis 801 indicates the processing flow of the file control unit 105, and a time axis 802 indicates the processing flow of the hard disk drive 103.

Step: 803 The client 101 sends a file read request to the file control unit 105. In this embodiment, it is assumed that the NFS described above is used as the input/output protocol between the client 101 and the file control unit 105. When a read request is issued in the NFS, a file name or an identifier uniquely identifying the file, the offset position of requested data from the start of the file, and the size of requested data are sent with the instruction.

Step: 804 The file control unit 105 receives the read request.

Step: 805 The file system 115 searches the hard disk drive 103 for the data requested by the client 101 based on the received information. According to an input/output protocol such as the SCSI standard, the hard disk drive 103 is treated as an aggregate of fixed-size storage areas typically, 512B). A number is allocated to each fixed-size storage area. This number is called an LBA (Logical Block Address). Each hard disk drive 103 is also allocated a number called an LUN (Logical Unit Number). Therefore, when the file control unit 105 accesses data in the hard disk drive 103, the file control unit 105 specifies an LUN, LBA, and requested data size. Thus, the function of the file system 115 is to convert an input/output instruction, for which a file name or an identifier is specified by the client 101, to an input/output instruction for which an LUN, LBA, and requested data size are specified.

Step: 806 After the position (LUN, LBA) of data requested by the client 101 is identified by the processing of the file system 115, the file control unit 105 sends a read instruction to the hard disk drive 103 in which the data is saved. As described above, the LUN, LBA, and data size are specified for the read instruction.

Step: 807 The hard disk drive 103 receives the read instruction issued by the file control unit 105.

Step: 808 The hard disk drive 103 sends the data requested by the read instruction to the file control unit 105.

Step: 809 The file control unit 105 receives the data from the hard disk drive 103.

Step: 810 After the data is sent normally, the hard disk drive 103 informs the file control unit 105 that the read instruction has been terminated normally.

Step: 811 The file control unit 105 receives the normal termination information and confirms that the read instruction has been terminated normally.

Step: 812 The file control unit 105 sends the data received in step 811 to the client 101.

Step: 813 The client 101 receives the data sent from the file control unit 105.

Step: 814 When data transfer is terminated normally, the file control unit 105 informs the client 101 that the read request has been terminated normally.

Step: 815 The client 101 receives the normal termination information sent in step 814 and confirms that the read request is terminated normally.

A standard file server uses a technology for saving frequently-used data in the semiconductor memory in the file control unit 105 to shorten the response time to the client 101 and a technology for predicting data to be requested by the next read instruction and for reading data from the hard disk drive 103 before the read instruction to shorten the response time. With reference to FIG. 9, the processing flow is described in which the client 101 sends a read request to the file control unit 105 when the requested data is saved in the file control unit 105. A time axis 900 indicates the processing flow of the client 101. A time axis 901 indicates the processing flow of the file control unit 105. A time axis 902 indicates the processing flow of the hard disk drive 103.

Step: 903 The client 101 sends a read request to the file control unit 105.

Step: 904 The file control unit 105 receives the read request.

Step: 905 The file control unit 105 searches the hard disk drive 103 for the data requested by the client 101 based on the information received by the file system 115. A check is made, based on the result of the search, if the desired data is saved in the semiconductor memory in the file control unit 105. If the desired data is not in the semiconductor memory in the file control unit 105, the processing shown by the ladder chart in FIG. 8 is executed. FIG. 9 shows the processing executed when the desired data is saved in the file control unit 105.

Step: 906 The file control unit 105 sends the data to the client 101.

Step: 907 The client 101 receives the data sent from the file control unit 105.

Step: 908 When the data transfer is terminated normally, the file control unit 105 informs the client 101 that the read request is terminated normally.

Step: 909 The client 101 receives the normal termination information sent in step 908 and confirms that the read request has been terminated normally.

Next, with reference to FIG. 10, the processing executed by the client 101 to write data will be described. A time axis 1000 indicates the processing flow of the client 101. A time axis 1001 indicates the processing flow of the file control unit 105. A time axis 1002 indicates the processing flow of the hard disk drive 103.

Step: 1003 The client 101 sends a request to the file control unit 105 to write data in a file.

Step: 1004 The file control unit 105 receives the file write request.

Step: 1005 The client 101 sends new data to the file control unit 105.

Step: 1006 The file control unit 105 receives the new data.

Step: 1007 The file control unit 105 saves the received data once in the semiconductor memory. The file control unit 105 searches a magnetic disk in which the file control unit should save said received data and the file control unit determines LUN and LBA of the magnetic disk.

Step: 1008 The file control unit 105 informs the client 101 that the write request has been terminated normally.

Step: 1009 The client 101 receives the information sent in step 1008, confirms that the file write processing has been terminated normally, and goes to the next processing.

Step: 1010 The file control unit 105 sends a write instruction to the hard disk drive 103. Because the LUN and LBA in which the data is saved was found in step 1007, the LUN and LBA are sent.

Step: 1011 The hard disk drive 103 receives the write instruction sent in step 1010.

Step: 1012 The file control unit 105 sends the data to the hard disk drive 103.

Step: 1013 The hard disk drive 103 receives the data.

Step: 1014 When the hard disk drive 103 receives the data normally, it informs the file control unit 105 that the data transfer has been terminated normally.

Step: 1015 The file control unit 105 receives the normal termination information and confirms that the write instruction has been terminated normally.

Figure 9:
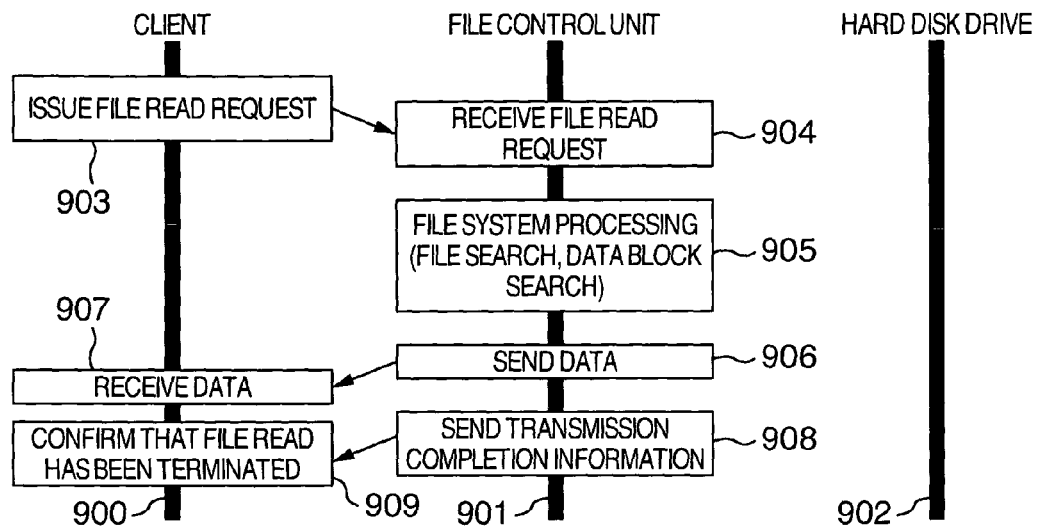
FIG. 9 is a ladder chart showing the operation executed when the client 101 sends a file read request to the file control unit 105 according to the present invention and desired data is found in the file control unit 105.
Figure 10:
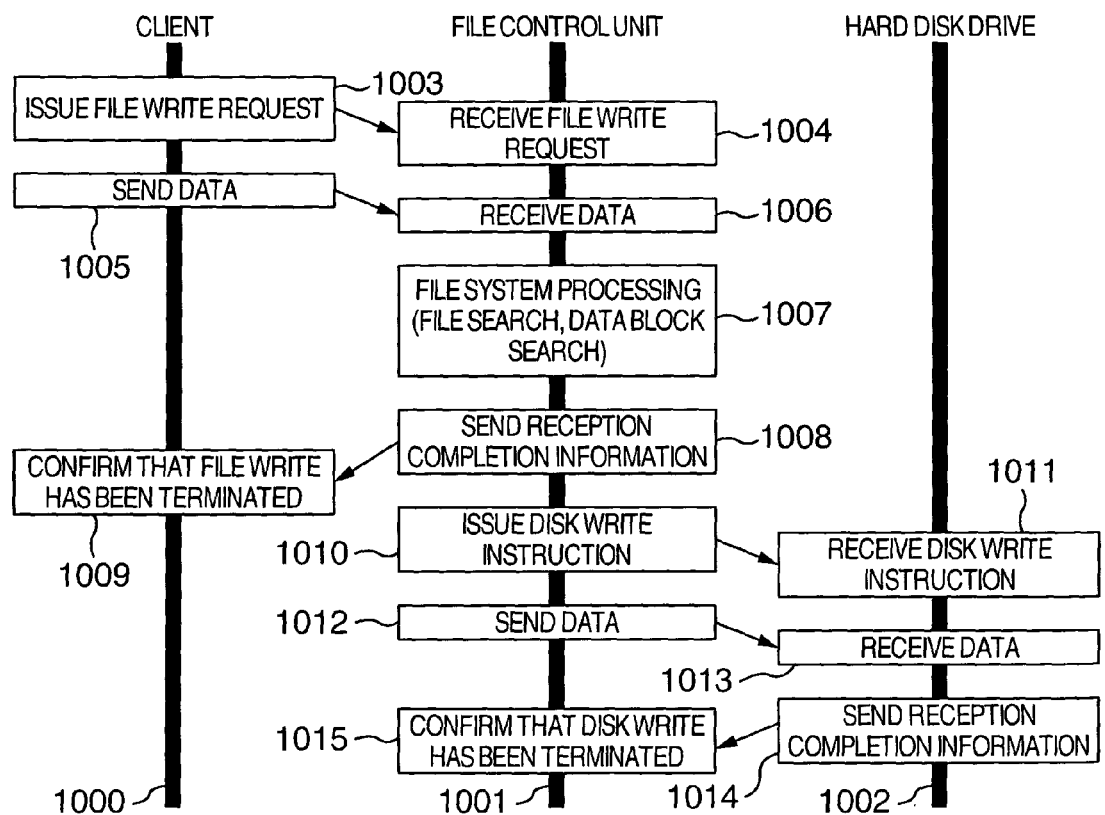
FIG. 10 is a ladder chart showing the operation executed when the client 101 sends a file write request to the file control unit 105 according to the present invention.

As shown in FIGS. 8 to 10, data is sent always via the file control unit 105 in the system according to the present invention. In the prior-art system shown in FIG. 2, only the data transfer is performed directly between the client 101 and the hard disk drive 103. Although the prior-art system is seemingly more effective, the system according to the present invention is superior in the following points:

(1) The file control unit has a cache effect.

(2) The client needs not to have the function to directly access the hard disk drive.

With regard to (1), when the file control unit 105 includes desired data as shown in FIGS. 9 and 10, the response time of the file control unit 105 becomes shorter. Such an effect cannot be expected when data is transferred directly between the client 101 and the hard disk drive 103. In addition, according to the present invention, it is possible for the file control unit 105 to save frequently used data in the file control unit 105 or to predict an access pattern and read data, which is likely to be accessed next, from the hard disk drive 103 before the client 101 accesses the data.

Figure 2:
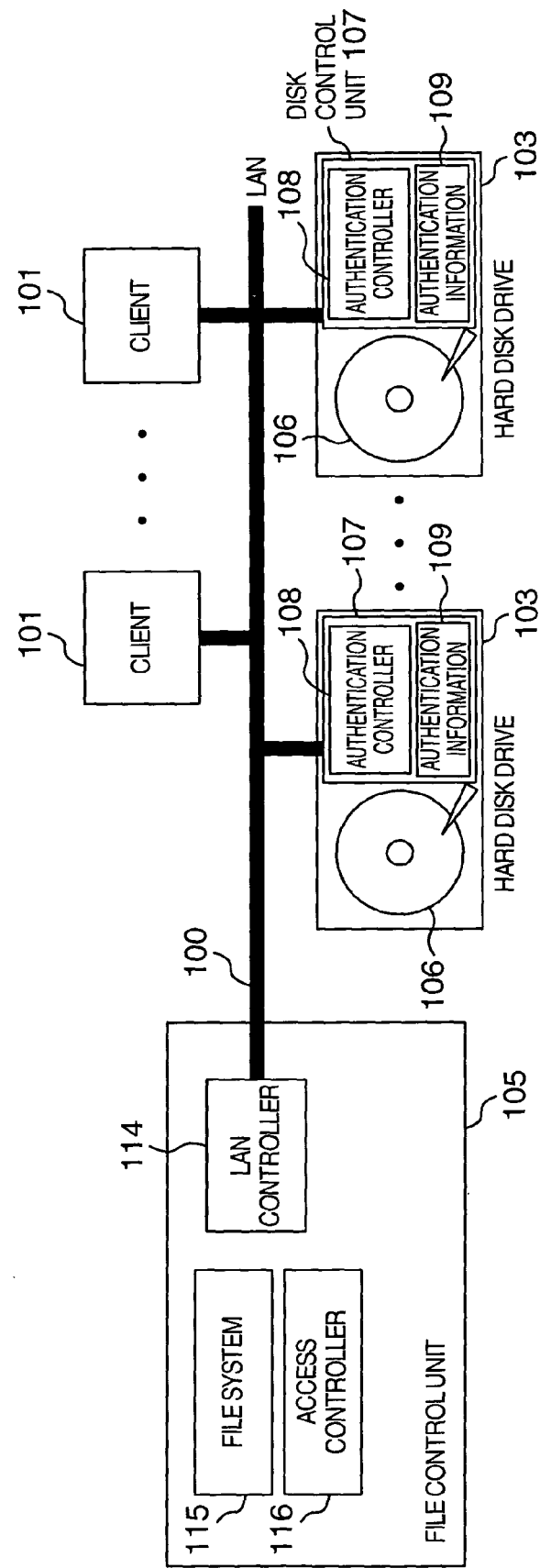
FIG. 2 is a diagram showing the configuration of a conventional file server.

With regard to (2), when data is transferred directly between the client 101 and the hard disk drive 103 as in the prior-art system shown in FIG. 2, the client 101 and the hard disk drive 103 must support one protocol. This means that the client 101 must have software installed that implements such a function. By contrast, the client 101 in the system according to the present invention is not required to have such a function but is only required to support the NFS or CIFS (Common Internet File System) that are widely used.

In view of those points, data transfer via the file control unit 105 also has advantages.

When the hard disk drive 103 is connected not only to the file control unit 105 but also to the client 101 via the LAN 100 or a network as in the configuration shown in FIG. 1, access by the client 101 to the hard disk drive 103 must be limited. This requires the authentication information 109 to be set up according to the initialization procedure shown in FIG. 7 so that the client 101 cannot access the hard disk drive 103. As described above, the file control unit 105 and the hard disk drive 103 are combined as shown in the configuration in FIG. 1 to function as one file server that provides file services.

Second Embodiment

Figure 11:
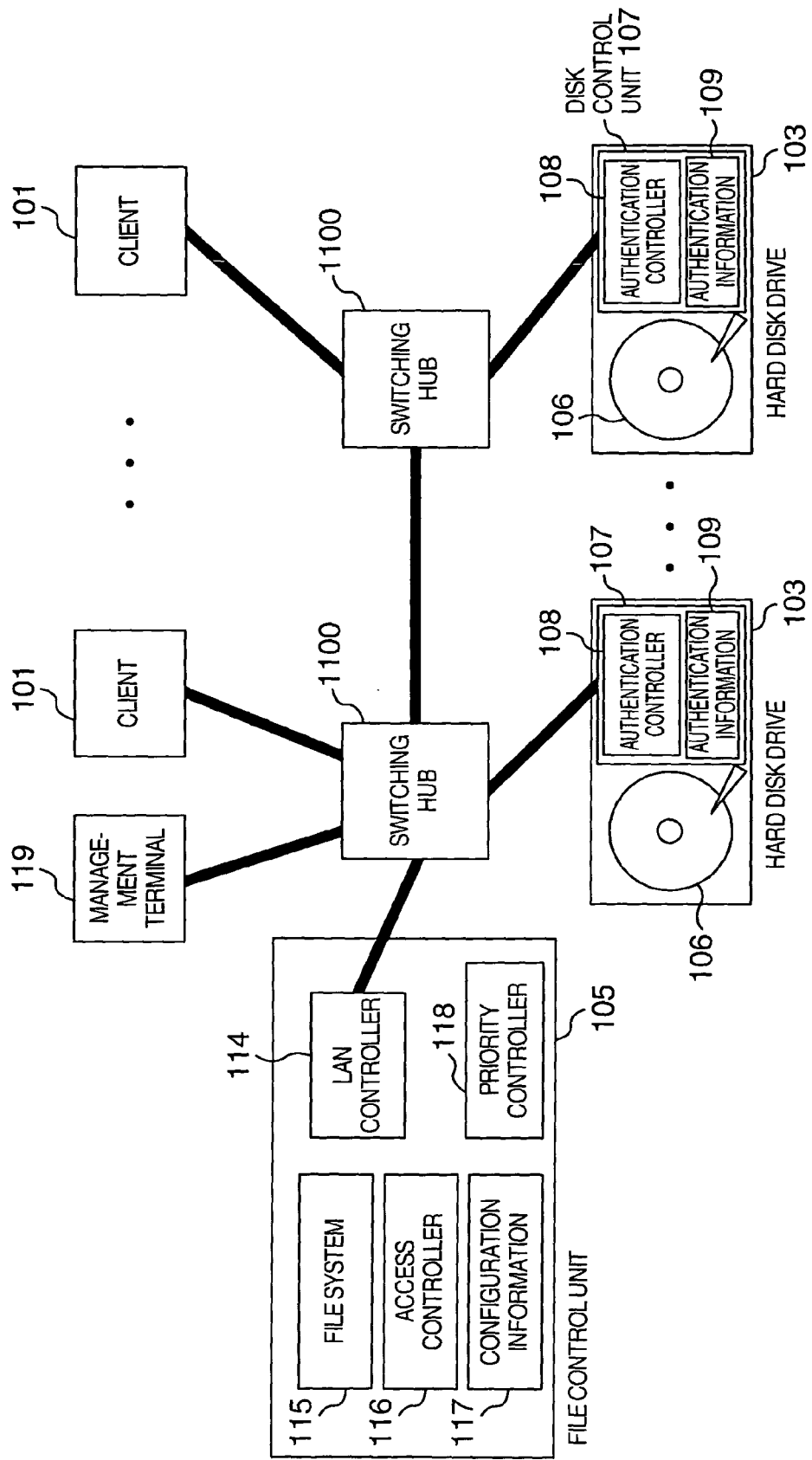
FIG. 11 is a diagram showing the configuration of a second embodiment of the present invention.
Figure 12:
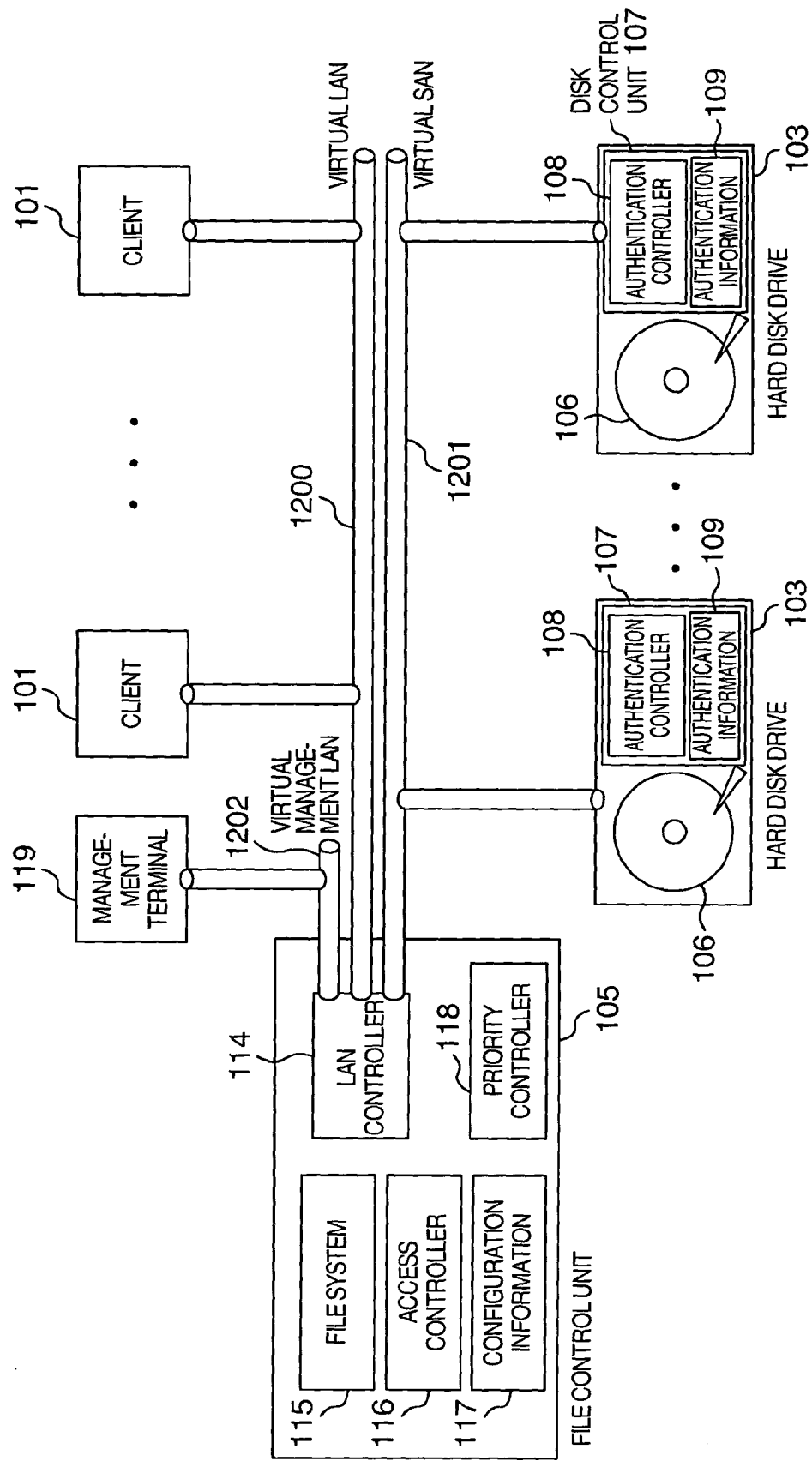
FIG. 12 is a diagram showing the concept when virtual networks are generated in the configuration in FIG. 11.

With reference to the drawings, the following describes how to implement a file server according to the present invention using a VLAN (Virtual LAN) technology. VLAN is a method by which a virtual network, different from a physical network, is built to implement an easy-to-reconfigure network system. The VLAN technology is described in detail in "VPN/VLAN Class Book" (supervised by Haruki Koretomo, Multimedia communication Study Group, ASCII Corporation, 1999). A LAN 100, which is described as one transmission medium in the first embodiment, is usually have a physical configuration in which clients 101, hard disk drives 103, a file control unit 105, a management terminal 119, and switching hubs 1100 are connected as shown in FIG. 11. The VLAN technology allows a switching hub 1100 to have a frame relay rule to implement a virtual network. In this embodiment, how to build virtual networks using the VLAN technology, such as those shown in FIG. 12, will be described. That is, the following three types of LAN are built: a virtual management LAN 1202 via which communication is made between the file control unit 105 and the management terminal 119, a virtual LAN 1200 via which communication is made between the file control unit 105 and the clients 101, and a virtual SAN 1201 via which communication is made between the file control unit 105 and the hard disk drives 103.

There are the following three types of VLAN technology:
(1) Physical port based VLAN
(2) MAC address based VLAN
(3) Protocol based VLAN A physical port based VLAN, denoted by (1), is built by setting up a relay rule among the physical ports of the switching hubs 1100. An MAC address based VLAN, denoted by (2), is a method in which a relay rule is set up for the MAC addresses of the source and the destination described in a MAC frame sent or received via the network. The MAC address based VLAN is more flexible than the VLAN in (1). A protocol based VLAN, denoted by (3), is a method in which a VALN is built according to the type of the upper layer of the MAC layer. The protocol used in this embodiment is NFS and iSCSI, which are upper layer protocols of TCP/IP. Therefore, TCP/IP is used as the upper layer protocol of the MAC layer. Thus, the virtual management LAN 1202, virtual LAN 1200, and virtual SAN 1201 use TCP/IP as a common protocol, and the protocol based VALN cannot be applied in this embodiment. Therefore, the MAC address based VLAN is used in the description of the VLAN used in the embodiment. In the MAC address based VLAN, the MAC addresses of clients 101, hard disk drives 103, file control unit 105, and management terminal 119 are classified in each VLAN. A relay rule is given to the switching hub 1100. When the source MAC address and the destination MAC address of a MAC frame to be relayed are the MAC addresses of network devices belonging to the same VLAN, the switching hub 1100 relays the MAC frame; when the MAC addresses are the addresses of network devices belonging to different VLANs, the switching hub 1100 does not relay the MAC frame.

VLANs can be built in this way with the file control unit 105 belonging to a plurality of VLANs at the same time. That is, the file control unit 105 belongs to the three: virtual management LAN 1202, virtual LAN 1200, and virtual SAN 1201. Usually, a network device has one MAC address for each physical port. The file control unit 105 has only one physical port. Normally, the file control unit 105 can have only one MAC address. The file control unit 105, which can have only one MAC address, can belong to only one VLAN. To belong to three VALNs at the same time, the LAN controller 114 must have MAC addresses, one for each VLAN, to which the file control unit 105 belongs. This LAN controller 114 is a feature of the present invention.

With reference to FIG. 13, the following describes in detail the file control unit 105 when MAC address based VLANs are used. A virtual SANMAC layer transmission queue 1300 is generated in the LAN controller 114 corresponding to the virtual SAN 1201. Because a MAC address is assigned corresponding to each VALN, a MAC layer transmission/reception queue is also generated corresponding to each VLAN. A virtual LANMAC layer transmission queue 1301 is generated corresponding to the virtual LAN 1200, and a virtual management LANMAC layer transmission queue 1302 is generated corresponding to the virtual management LAN 1202. Also, a virtual SANMAC layer reception queue 1303, a virtual LANMAC layer reception queue 1304, and a virtual management LANMAC layer reception queue 1305 are generated as the MAC layer reception queues. Those MAC layer transmission/reception queues 1300-1305 correspond one to one with the upper layer transmission/reception queues 1306-1311. In addition, the priority controller 118 comprises priority setting information 1312 and transfer amount management information 1313. The priority setting information 1312 contains the priority information on the virtual channels. The transfer amount management information 1313 contains bandwidth information for each virtual LAN, set up by the manager or the priority controller 118, that is determined by monitoring the data transfer amount.

The following describes the priority setting information 1312 with reference to FIG. 14. A virtual network type column 1400 contains the type of a virtual network. A priority column 1401 contains the priority of a virtual network. The manager can set the priority through the operation of the management terminal 119. The larger the numeric value in the priority column is, the higher the priority is. In this embodiment in which the virtual management LAN 1202, virtual LAN 1200, and virtual SAN 1201 are used, their priorities are 3, 1, and 2, respectively. That is, the virtual management LAN 1202 has the highest priority. If the priority of the virtual management LAN 1202 is low, the manager cannot operate the file server in some cases. The manager operates the management terminal 119, and the management terminal 119 sends the manager's operation to the file control unit 105 as an instruction. Therefore, if the priority of the virtual management LAN 1202 is low, the transmission of the manager's operation instruction to the file control unit 105 is delayed and, if the delay is long, the operation of the file server cannot be virtually performed. Therefore, the highest priority should be given to the virtual management LAN 1202. The next higher priority is given to the virtual SAN 1201. The reason is as follows. For better performance, the file control unit 105 caches data, obtained from the hard disk drive 103, in the memory. To increase the cache effect, the length of data requested by the file control unit 105 to read from the hard disk drive 103 is longer from the length of data requested by the client 101 to read from the file control unit 105. This requires the virtual SAN 1201 to have a band broader than that of the virtual LAN 1200, and its priority should be set higher.

Figures 15, 16:
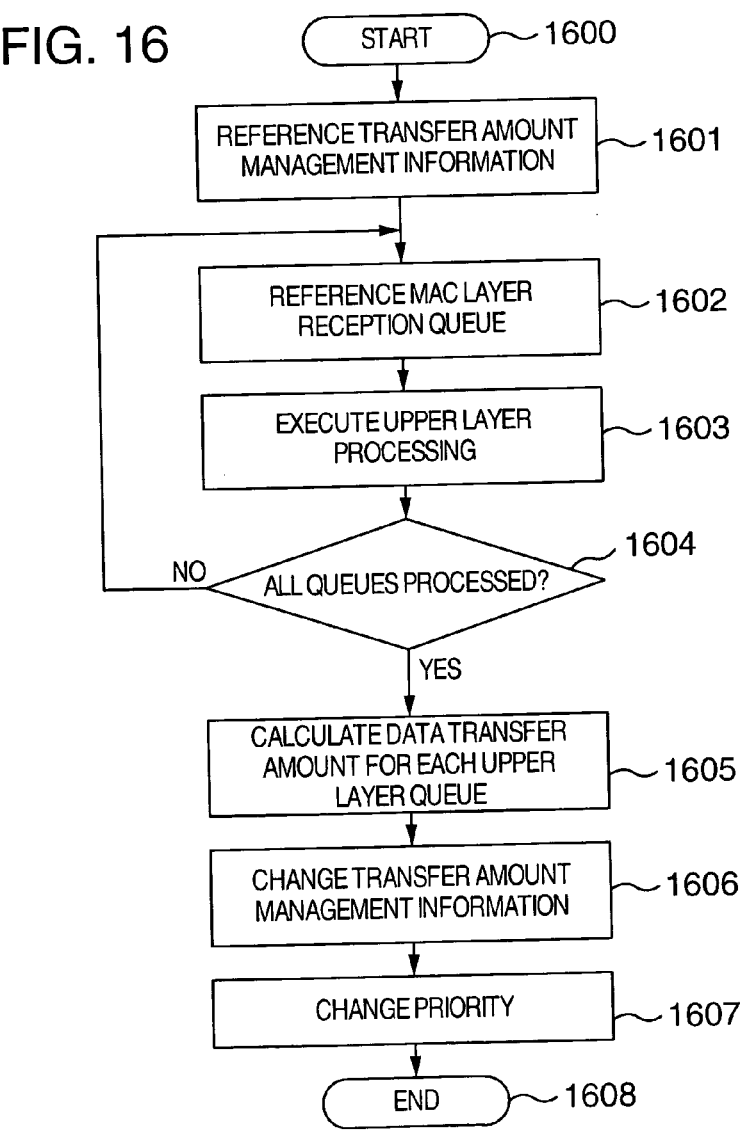
FIG. 15 is a diagram showing transfer amount management information 1313.
FIG. 16 is a flowchart showing the reception processing of the file control unit 105 when bandwidth control is performed.

Next, the following describes the transfer amount management information 1313 with reference to FIG. 15. A virtual network type column 1500 contains the type of a virtual network. A transfer amount column 1501 contains the accumulated value of sizes of data transferred over each virtual network within a predetermined time in the past. The priority controller 118 resets the value of the transfer amount column 1501 to 0 at an interval of the predetermined time. A bandwidth column 1502 indicates the percentage of the bandwidth of the LAN 100 that is allocated to a virtual network. The reason why the percentage, not the absolute value, of the bandwidth is set is that data transfer is not always executed and therefore it is not appropriate that the priority is evaluated using the absolute value of the bandwidth. Instead of the percentage of the bandwidth, it is also possible to set the percentage or the ratio of the amount of data transferred over the virtual networks to carry out the present invention. The description below assumes that the percentage of the bandwidth is set in this column. A priority column 1503 contains the priorities among the virtual networks. The priority in the priority column 1503 is calculated by the priority controller 118 from the relation between the transfer amount column 1501 and the bandwidth column 1502. For example, the available bandwidth Δi of a numbered virtual network i is expressed by expression 1 below.

$$\Delta_i = y_i - X_i \bigg/ \sum_{i=1}^{3} X_i \qquad (1)$$

where, Xi is the transfer amount of virtual network i and Yi is the bandwidth that is set.

The priorities among the virtual networks are set according to the relation. That is, when Δi is large, the priority controller 118 increases the priority of the corresponding virtual network and, when Δi is small, decreases the priority of the corresponding virtual network.

With reference to FIG. 16, the following describes the operation executed by the file control unit 105 in this embodiment when data is received. FIG. 16 is a flowchart showing how the priority controller 118 controls the bandwidth by referring to the transfer amount management information 1313.

Step: 1600 Start of processing

Step: 1601 The LAN controller 114 references the priority column 1503 of the transfer amount management information 1313 to confirm the processing priorities of the VLANs.

Step: 1602 The LAN controller 114 references the highest-priority MAC layer reception queue and moves the stored messages to the corresponding upper layer reception queue.

Step: 1603 The LAN controller 114 executes the reception processing of the corresponding upper layer.

Step: 1604 The LAN controller 114 checks if the messages in all reception queues have been processed. If all reception queues are not yet processed, control is passed back to step 1602 and the messages stored in the next highest priority reception queue are processed. When the LAN controller 114 has processed the messages in all reception queues, control is passed to step 1605.

Step: 1605 The LAN controller 114 calculates the accumulated size of data received in step 1603 for each of upper layer reception queues 1309, 1310, and 1311.

Step: 1606 The LAN controller 114 adds the accumulated size of received data, calculated in step 1605, to the transfer amount column 1501 for each virtual network.

Step: 1607 The priority controller 118 sets the priority, calculated by (formula 1) from the numeric value in the transfer amount column 1501 updated in step 1606, in the priority column 1503 for each virtual network.

Step: 1608 End of processing

Figure 17:
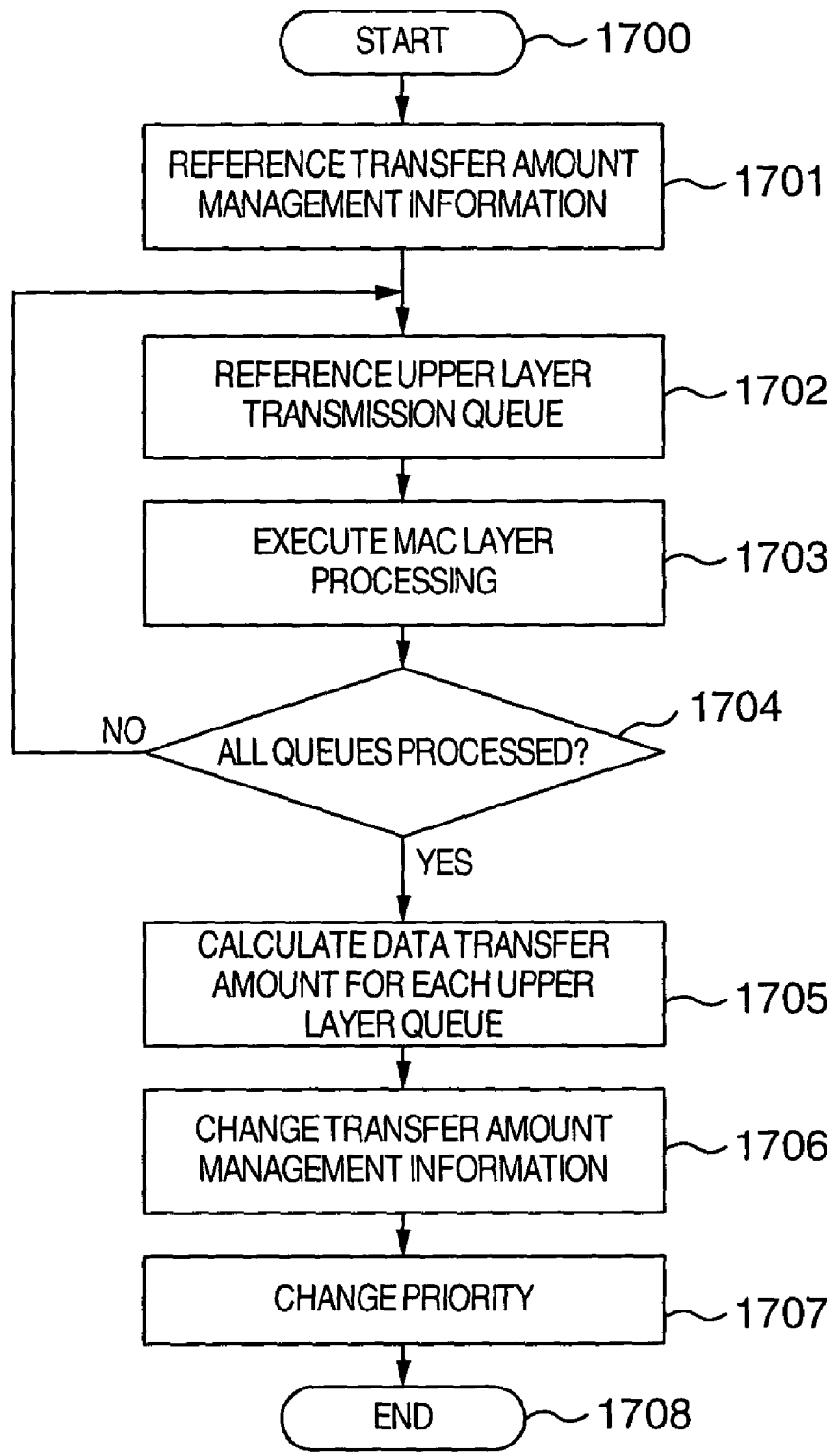
FIG. 17 is a flowchart showing the transmission processing of the file control unit 105 when bandwidth control is performed.
Figure 20:
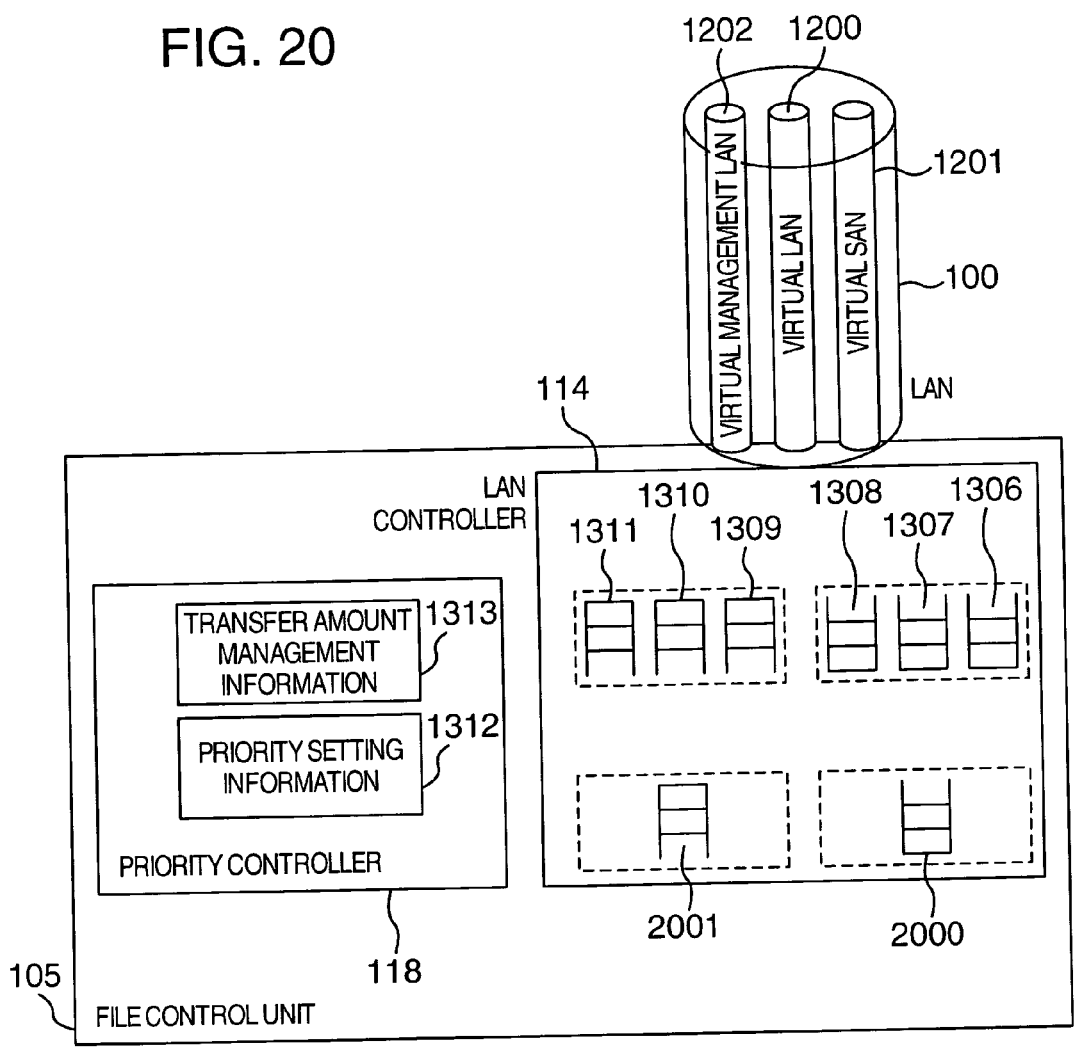
FIG. 20 is a diagram showing the internal status of the file control unit 105 when virtual networks are generated not by VLAN technology but by encryption.
Figure 21:
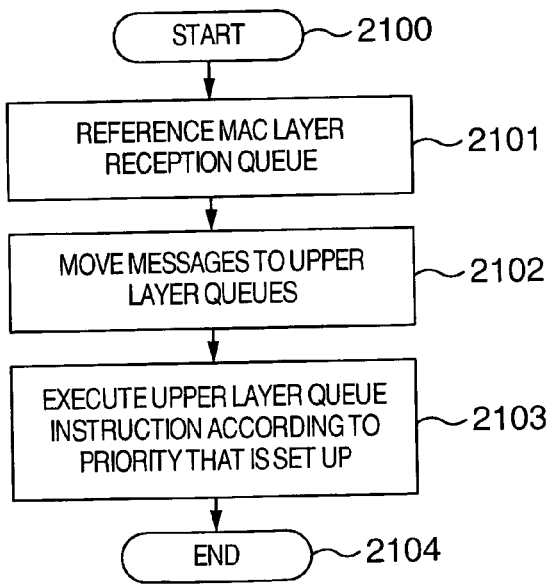
FIG. 21 is a flowchart showing the reception processing of the file control unit 105 when priority setting is performed.
Figure 24:
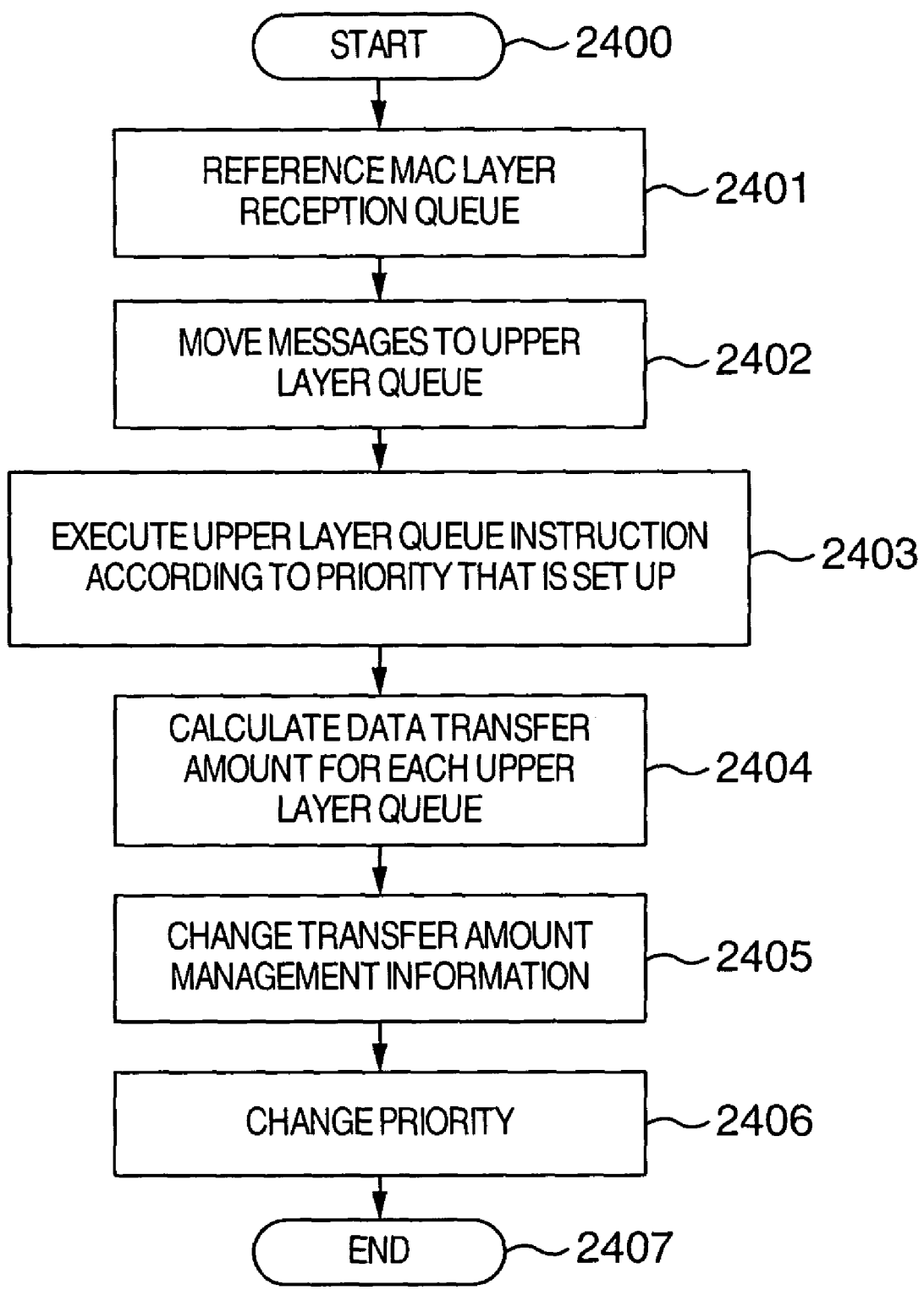
FIG. 24 is a flowchart showing the transmission processing of the file control unit 105 when bandwidth control is performed.

With reference to FIG. 17, the following describes the operation executed by the LAN controller 114 in this embodiment when data is sent. FIG. 17 is a flowchart showing how the LAN controller 114 controls the bandwidth by referring to the transfer amount management information 1313.

Step: 1700 Start of processing

Step: 1701 The LAN controller 114 references the priority column 1503 of the transfer amount management information 1313 to confirm the priorities.

Step: 1702 The LAN controller 114 references the highest-priority upper layer transmission queue and moves the stored messages to the corresponding MAC layer transmission queue.

Step: 1703 The LAN controller 114 executes the transmission processing of the corresponding MAC layer.

Step: 1704 The LAN controller 114 checks if the messages in all transmission queues have been processed. If all transmission queues are not yet processed, control is passed back to step 1702 and processing for the next highest-priority transmission queue is executed. When the LAN controller 114 has processed the messages in all transmission queues, control is passed to step 1705.

Step: 1705 The LAN controller 114 calculates the accumulated size of data transmitted in step 1703 for each of upper layer transmission queues 1306, 1307, and 1308.

Step: 1706 The LAN controller 114 adds the accumulated size of transmitted data, calculated in step 1705, to the transfer amount column 1501 for each virtual network.

Step: 1707 The priority controller 118 sets the priority, calculated by (expression 1) from the numeric value in the transfer amount column 1501 updated in step 1706, in the priority column 1503 for each virtual network.

Step: 1708 End of processing

Next, the following describes the transmission/reception control processing executed by the LAN controller 114 according to the preset priorities using the priority setting information 1312. With reference to FIG. 18, the operation executed by the LAN controller 114 in this embodiment when data is received will be described.

Step: 1800 Start of processing

Step: 1801 The LAN controller 114 references the priority column 1401 of the priority setting information 1312 to confirm the priorities.

Step: 1802 The LAN controller 114 references the highest-priority MAC layer reception queue and moves the stored messages to the corresponding upper layer reception queue.

Step: 1803 The LAN controller 114 executes the reception processing of the corresponding upper layer.

Step: 1804 The LAN controller 114 checks if the messages in all reception queues have been processed. If all reception queues are not yet processed, control is passed back to step 1802 and the next highest-priority reception queue is processed. When the LAN controller 114 has processed the messages in all reception queues, control is passed to step 1805.

Step: 1805 End of processing

With reference to FIG. 19, the operation executed by the LAN controller 114 in this embodiment when data is transmitted will be described.

Step: 1900 Start of processing
Step: 1901 The LAN controller 114 references the priority column 1401 of the priority setting information 1312 to confirm the priorities.
Step: 1902 The LAN controller 114 references the highest-priority upper layer transmission queue and moves the stored messages to the corresponding MAC layer transmission queue.
Step: 1903 The LAN controller 114 executes the transmission processing of the corresponding MAC layer.
Step: 1904 The LAN controller 114 checks if the messages in all transmission queues have been processed. If all transmission queues are not yet processed, control is passed back to step 1902 and processing for the next highest-priority transmission queue is executed. When the LAN controller 114 has processed the messages in all transmission queues, control is passed to step 1905.
Step: 1905 End of processing As described above, the LAN controller 114 can perform the priority control of virtual network communication on the LAN 100 according to the preset priorities. The LAN controller 114 can also perform the bandwidth control of communication according to a bandwidth set up for each virtual network. Although such priority control and bandwidth control technologies are well known in the area of communication intermediary devices such as switches and routers, a communication originating or receiving device (called an endpoint) such as the file control unit 105 can also perform priority control and bandwidth control among virtual networks according to the purposes.

Priority control and bandwidth control used on virtual networks described above may be applied also to virtual networks built by non-VLAN means, for example, to a virtual network where encryption is used that is disclosed in "File Server Scaling with Network-Attached Secure Disks" (written by Garth A. Gibson et. al, Research paper "THE 1997 ACM SIGMETRICS INTERNATIONAL CONFERENCE ON MEASUREMENT AND MODELING OF COMPUTER SYSTEMS, pp. 272-284).

Third Embodiment

Figure 25:
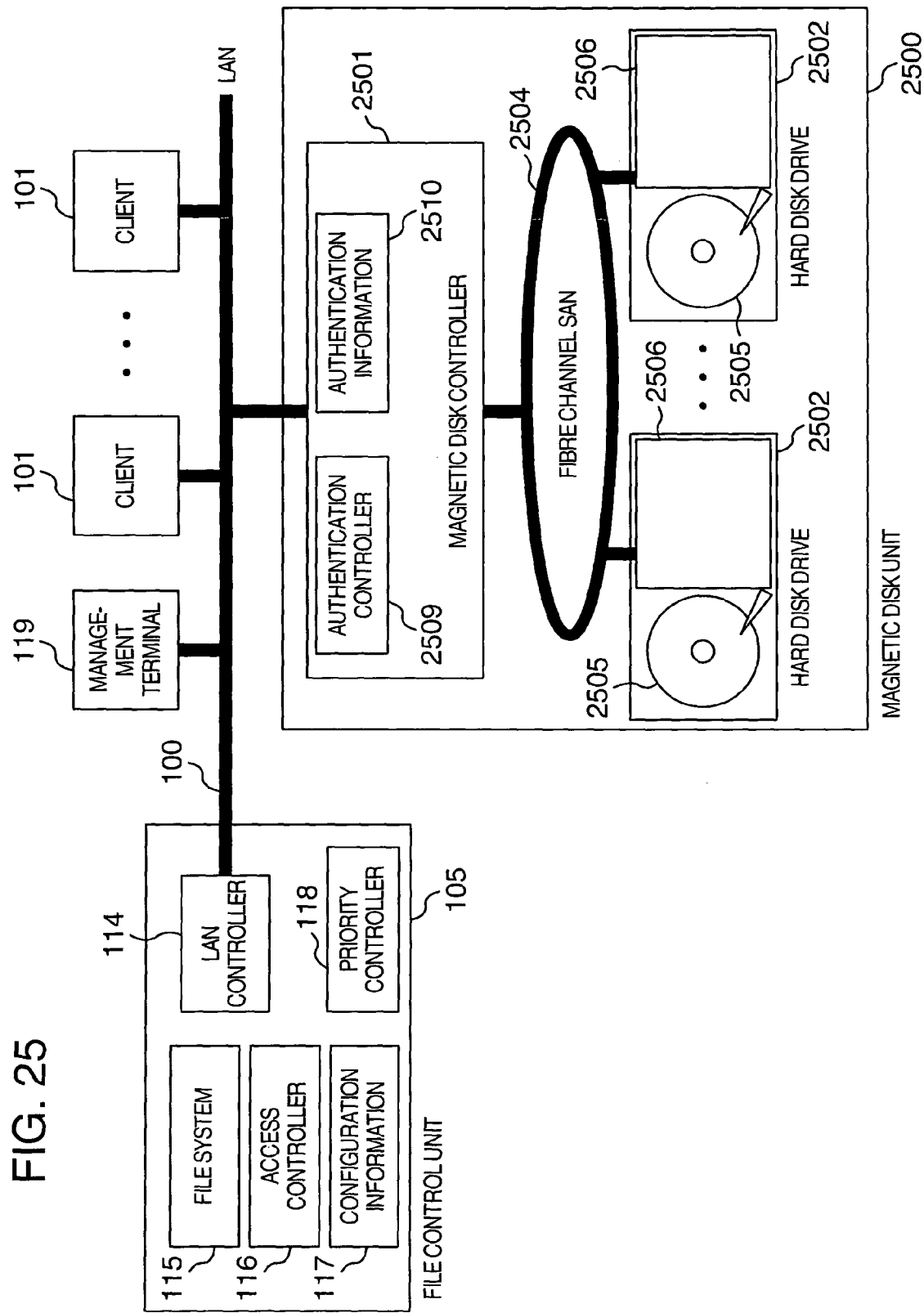
FIG. 25 is a diagram showing the configuration when a magnetic disk unit 2500 is connected to the LAN 100.

With reference to FIG. 25, the following describes an application example of the present invention that is used in a system where a magnetic disk unit containing a plurality of hard disk drives is connected to a LAN 100. A magnetic disk unit 2500 has a configuration in which a magnetic disk control unit 2501 and hard disk drives 2502 are connected via a fibre channel SAN 2504. The hard disk drive 2502 comprises a magnetic disk medium 2505 and a disk control unit 2506. Unlike the magnetic disk control unit 107 described above in the first and second embodiments, the disk control unit 2506 has a fibre channel interface. The fibre channel SAN 2504, a closed network, does not need to have the security function such as the certification function existing on the magnetic disk control unit 107. According to the present invention, a virtual network built between the file control unit 105 and the magnetic disk unit 2500 makes it possible to implement data protection and bandwidth control. Therefore, the magnetic disk control unit 2501 has the authentication controller 108 and the authentication information 109 that are necessary on the hard disk drive 103 in the first and second embodiments. Thus, an authentication controller 2509 and authentication information 2510 in the magnetic disk control unit 2501 are functionally equivalent to the authentication controller 108 and the authentication information 109 described in the first embodiment.

Figure 26:
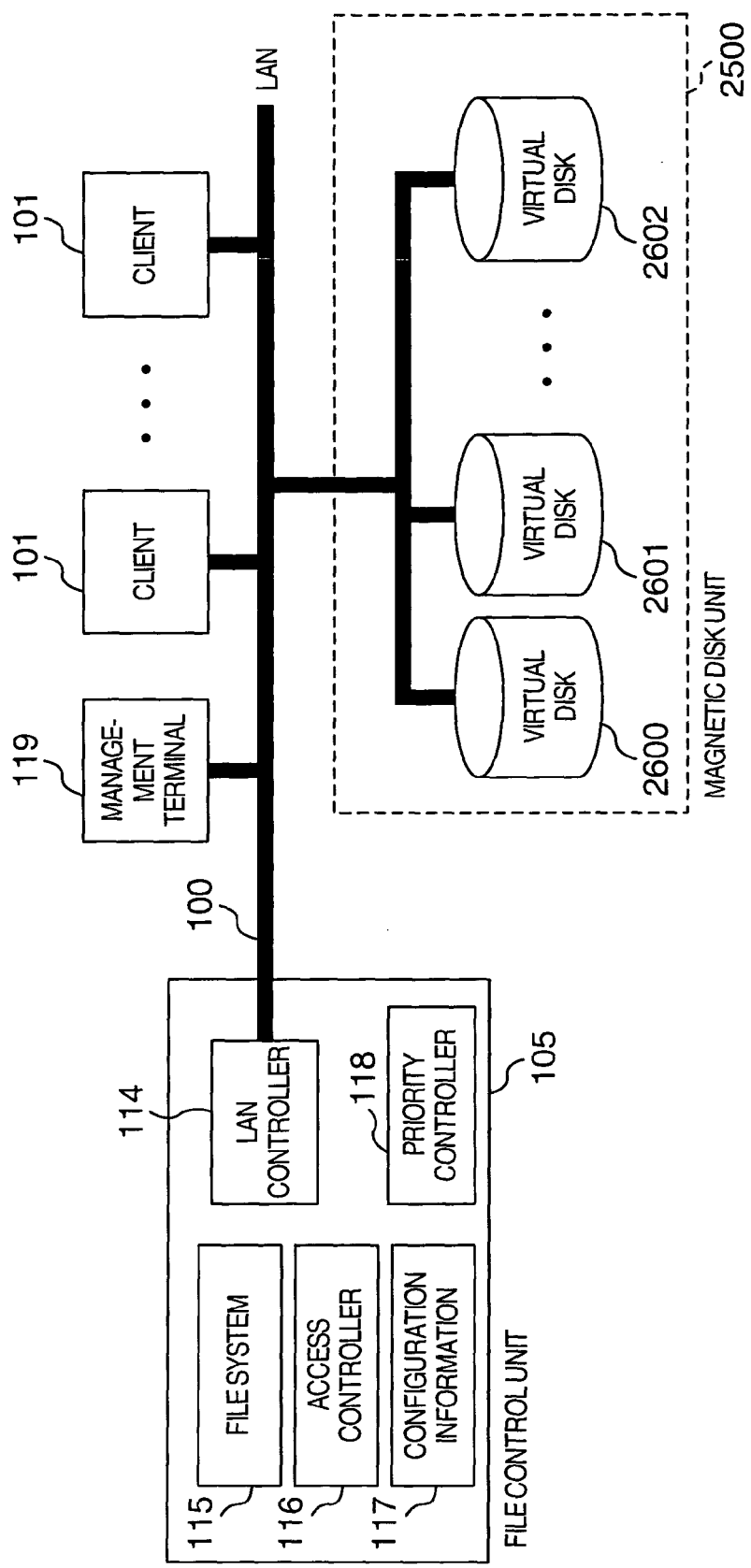
FIG. 26 is a diagram showing the concept of the connection mode of virtual disks recognized by the file control unit 105.

The magnetic disk unit 2500 in FIG. 25 sometimes provides the file control unit 105 with services on a virtual disk unit. A virtual disk refers to a virtual hard disk drive made up of partial or all storage areas of the hard disk drive 2502 that the magnetic disk control unit 2501 makes the file control unit 105 recognize as one hard disk drive. A virtual disk, a disk virtually created by the magnetic disk control unit 2501, may be in many forms; for example, a plurality of hard disk drives may be formed as one virtual disk. The file control unit 105 cannot distinguish this virtual disk from the hard disk drive 2502 that is a physical entity. The virtual disk is shown in FIG. 26. The file control unit 105 identifies virtual disks 2600, 2601, and 2602 are connected to the LAN 100 but does not recognize the magnetic disk control unit 2501. According to the present invention, a virtual LAN 1200, a virtual SAN 1201, and a virtual management LAN 1202 can be generated as shown in FIG. 27. The virtual disks 2600, 2601, and 2602 are connected to the virtual SAN 1201 and therefore clients 101 and a management terminal 119 cannot access the virtual disks 2600, 2601, and 2602.

In addition, as a modification of the system shown in FIG. 27, it is also possible for the file control unit 105 to establish the security setting for each of the virtual disks 2600, 2601, and 2602. In that case, the authentication information 2510 has a format different from that of the authentication information 109 shown in FIG. 4. FIG. 28 shows the format of the authentication information 2510 in this case. A virtual disk identifier column 2800 contains identifiers assigned to the virtual disks 2600, 2601, and 2602 by the magnetic disk control unit 2501. Like the MAC address column 400 shown in FIG. 4, a MAC address column 2801 is a column in which the magnetic disk control unit 2501 sets the MAC address of a network device that is permitted access. Like the IP address column 401 shown in FIG. 4, an IP address column 2802 is a column in which the magnetic disk control unit 2501 sets the IP address of a network device that is permitted access. Like the authentication code column 402 shown in FIG. 4, an authentication code column 2803 is a column in which the magnetic disk control unit 2501 sets the authentication code of a network device that is permitted access. Like the owner flag column 403 shown in FIG. 4, an owner flag column 2804 is a column indicating whether the network device that is set in the MAC address column 2801 has the owner authority of this virtual disk. By establishing the security setting for each of the contained virtual disks 2600, 2601, and 2602 as described above, the virtual disks may be managed in such a way that some are placed under the management of the file control unit 105 and some other under the management of the client 101.

Fourth Embodiment

Figure 29:
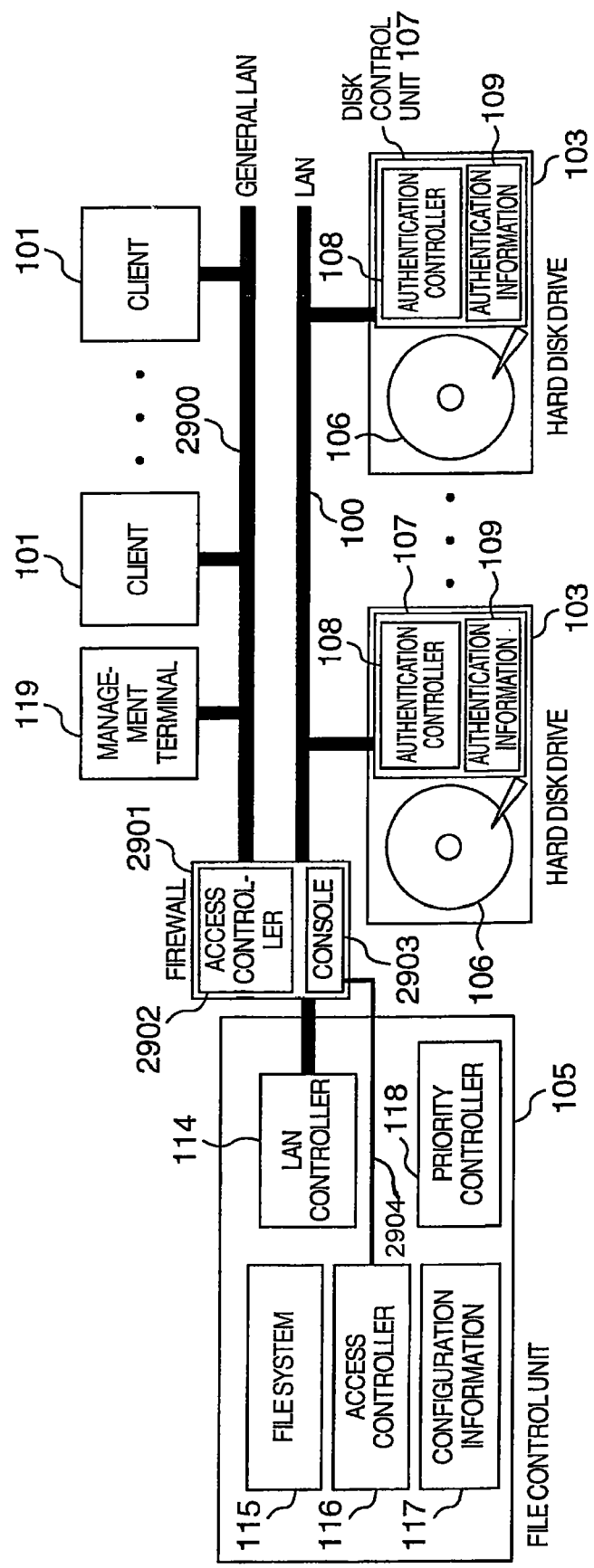
FIG. 29 is a diagram showing the configuration of a fourth embodiment of the present invention.

With reference to FIG. 29, a fourth embodiment of the present invention will be described. Referring to FIG. 29, the network topology is different from that of the first embodiment. Clients 101 and a management terminal 119 are connected to a general LAN 2900, which is connected to a file control unit 105 via a firewall 2901. Hard disk drives 103 are connected to a LAN 100, which is connected to the file control unit 105 via the firewall 2901 as with the general LAN 2900. An access controller 2902 of the firewall controls communication among the clients 101, file control unit 105, hard disk drives 103, and management terminal 119. That is, the access controller 2902 of the firewall relays communication data of the clients 101 and the management terminal 119 to or from the file control unit 105 but not to or from the hard disk drives 103. Also, the access controller 2902 of the firewall relays communication data between the hard disk drives 103 and the file control unit 105 but does not relay other communication data. The control operation like this prevents data in the hard disk drives 103 from being referenced or altered from a network device other than the file control unit 105.

Although the access control of the firewall 2901 must be set by the user, there is no meaning if the access control can be set by the management terminal 119 or clients 101. Because, if so, the management terminal 119 or the clients 101 may change the access control policy of the firewall 2901 so that the hard disk drives 103 can be accessed directly. Therefore, the setting of access control of the firewall 2901 should be changed only by a console 2903 physically connected to the firewall 2901. Although it is also possible that the file control unit 105 has means for changing the access control information on the firewall 2901, it is desirable that the information be changed only via a directly and physically connected path 2904.

The file server according to the present invention, which has means for limiting hard disk drives to the communication only with the file control unit, prevents clients from directly accessing the hard disk drives and from destroying or leaking data.

In the system according to the present invention, virtual networks, implemented by the VLAN technology and so on, are applied to the file server. This inhibits clients or the management terminal from directly accessing hard disk drives.

Another effect of the virtual networks described above is that, by making the management terminal, clients, and hard disk drives belong to different virtual networks, it is possible to prevent the management terminal from observing the communication between the file control unit and clients.

Because the file server according to the present invention allows the file control unit to set the priority of LAN communication with each sender/receiver, the highest priority can be assigned to the communication with the management terminal to enable the management terminal to always operate the file server. The method according to the present invention also has an effect that, when an excessive network load is placed on the file control unit, the manager can perform operation via the management terminal to prevent file services from being suspended.

A secondary effect of the present invention is that, because data is sent and received always via the file control unit, special functions required for the direct data transfer between clients and hard disk drives need not be installed on the clients and the hard disk drives.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A file server system comprising:
   a plurality of hard disk drives communicatively coupled with a plurality of clients via a network, each hard disk drive in the plurality of hard disk drives including authentication information identifying one or more devices on the network that are permitted to directly communicate with said each hard disk drive; and
   a file control unit communicatively coupled with a plurality of hard disk drives and the plurality of clients via the network, wherein the file control unit accepts requests from said plurality of clients to access said plurality of hard disk drives, thereby managing data input and output of said plurality of hard disk drives,
   wherein said file control unit includes configuration information identifying one or more of said plurality of hard disk drives, and
   wherein the file control unit is configured to:
      broadcast a hard disk drive search message to the plurality of hard disk drives via said network at each initialization of the file control unit,
      in response to the hard disk drive search message, receive from a hard disk drive, in the plurality of hard disk drives, ID information identifying the hard disk drive to said file control unit,
      if the ID information is found in the configuration information of the file control unit, send to the hard disk drive a command to establish an entry in the authentication information of the hard disk drive, wherein the entry prevents the hard disk drive from directly communicating with devices on said network other than said file control unit, and
   wherein the authentication information for each said hard disk drive includes an ownership flag identifying a device on the network as an owner of said each hard disk drive, and wherein the owner is permitted to modify the authentication information of said each hard disk drive.

2. The file server system according to claim 1, further comprising a management terminal connected to said file control unit to perform maintenance work.

3. The file server system according to claim 2, further comprising a firewall connected between said file control unit and said hard disk drives for controlling communication between said management terminal and said hard disk drives.

4. The file server system according to claim 2,
   wherein said file control unit comprises a priority unit that puts a higher priority on communication with said management terminal than on communication with said clients and on communication with said hard disk drives.

5. The file server system according to claim 1,
   wherein said file control unit and said plurality of hard disk drives have an iSCSI internet small computer system interface (iSCSI) interface for communication on the network using the internet protocol (IP).

6. The file server system according to claim 1,
   wherein each hard disk drive in the plurality of hard disk drives is configured to:
      receive a communication request from a device on the network;
      determine whether an authentication code sent by the device is found in the authentication information for said each hard disk drive;
      if the authentication code is found, allow the request; and
      if the authentication code is not found, reject the request.

7. The file server system according to claim 1,
   wherein the file control unit allows a requesting device on the network to set the ownership flag in the authentication information of any hard disk drive in the plurality of hard disk drives in which no owner has been set yet.

8. The file server system according to claim 1,
   wherein said file control unit comprises setting means that allows a manager of said file server system to set a ratio of an amount of data transferred in a communication between said file control unit and said clients to an amount of data transferred in a communication between said file control unit and said hard disk drives and wherein the amount of data transferred in the communication between said file control unit and said clients and the amount of data transferred in the communication between said file control unit and said hard disk drives are measured to control a priority of communication processing so that a ratio that is obtained by the measured data amounts approaches the ratio that is set.

* * * * *